(12) United States Patent
Bongers et al.

(10) Patent No.: US 11,397,993 B2
(45) Date of Patent: Jul. 26, 2022

(54) ELECTRONIC LOGGING AND TRACK IDENTIFICATION SYSTEM FOR MOBILE TELEMATICS DEVICES, AND CORRESPONDING METHOD THEREOF

(71) Applicant: Swiss Reinsurance Company Ltd., Zurich (CH)

(72) Inventors: Sebastiaan Bongers, Au (CH); Simone Bassis, Bergamo (IT); Bruno Apolloni, Cernusco sul Naviglio (IT)

(73) Assignee: Swiss Reinsurance Company Ltd., Zurich (CH)

( * ) Notice: Subject to any disclaimer, the term of this patent is extended or adjusted under 35 U.S.C. 154(b) by 199 days.

(21) Appl. No.: 16/783,945

(22) Filed: Feb. 6, 2020

(65) Prior Publication Data

US 2020/0175786 A1 Jun. 4, 2020

Related U.S. Application Data

(63) Continuation of application No. PCT/EP2017/072327, filed on Sep. 6, 2017.

(51) Int. Cl.
*G06Q 40/08* (2012.01)
*B60W 40/09* (2012.01)
(Continued)

(52) U.S. Cl.
CPC ............. *G06Q 40/08* (2013.01); *B60W 40/09* (2013.01); *G01C 21/12* (2013.01); *G01S 19/52* (2013.01);
(Continued)

(58) Field of Classification Search
USPC ........................................................... 701/1
See application file for complete search history.

(56) References Cited

U.S. PATENT DOCUMENTS

| 10,072,932 B2 * | 9/2018 | Cordova | ............... H04W 4/025 |
| 10,952,044 B2 * | 3/2021 | Cordova | ................ H04W 4/40 |

(Continued)

FOREIGN PATENT DOCUMENTS

| WO | 2006/130146 A1 | 12/2006 |
| WO | 2014/143624 A1 | 9/2014 |

OTHER PUBLICATIONS

International Search Report Issued in International Patent Application No. PCT/EP2017/072327 dated May 6, 2018, (4 pages).
(Continued)

*Primary Examiner* — Tyler D Paige
(74) *Attorney, Agent, or Firm* — Oblon, McClelland, Maier & Neustadt, L.L.P.

(57) ABSTRACT

An electronic logging and track detection system for mobile telematics devices and method are provided. In particular, an electronic logging and track detection system and system for mobile telematics devices, as smart phones and/or mobile cellular phones is proposed, which tend to change their sensing and measuring orientation and direction in respect to the main direction of movement/motion or moving sense, as for example given by a person with proper motion holding a mobile phone within a moving vehicle. Instantaneous movement telematics data are measured by and logged from sensors of the mobile telematics devices and trips and/or trip-segments based on the instantaneous movement sensory telematics data are automatically identified and detected at least by the telematics sensors comprising an accelerometer sensor and a gyroscope sensor and a Global Positioning System sensor. The telematics devices comprise one or more wireless connections acting as a wireless node within a corresponding data transmission network by means of antenna connections of the telematics device.

26 Claims, 9 Drawing Sheets

(51) Int. Cl.
*G01C 21/12* (2006.01)
*G06N 3/08* (2006.01)
*G06Q 10/06* (2012.01)
*G07C 5/00* (2006.01)
*G01S 19/52* (2010.01)
*G07C 5/08* (2006.01)
*G06Q 20/08* (2012.01)
*G07C 5/02* (2006.01)
*G08G 1/01* (2006.01)
*B60W 40/02* (2006.01)
*B60W 40/10* (2012.01)
*H04W 4/40* (2018.01)

(52) U.S. Cl.
CPC ........... *G06N 3/08* (2013.01); *G06Q 10/0635* (2013.01); *G06Q 20/08* (2013.01); *G07C 5/008* (2013.01); *G07C 5/02* (2013.01); *G07C 5/08* (2013.01); *G07C 5/085* (2013.01); *G08G 1/0112* (2013.01); *B60W 40/02* (2013.01); *B60W 40/10* (2013.01); *B60W 2540/30* (2013.01); *G07C 5/0825* (2013.01); *G07C 5/0858* (2013.01); *H04W 4/40* (2018.02)

(56) References Cited

U.S. PATENT DOCUMENTS

| | | | |
|---|---|---|---|
| 2013/0085861 A1* | 4/2013 | Dunlap | G06Q 30/0201 705/14.58 |
| 2013/0317944 A1* | 11/2013 | Huang | G06Q 30/0623 705/26.61 |
| 2015/0332518 A1* | 11/2015 | Menon | G06Q 40/08 705/4 |
| 2016/0066155 A1* | 3/2016 | Fan | H04W 4/027 455/457 |
| 2016/0094954 A1* | 3/2016 | Millman | G01S 5/0252 455/456.2 |
| 2016/0189308 A1* | 6/2016 | Bogovich | G08G 1/096838 705/4 |
| 2017/0265020 A1* | 9/2017 | Dewangan | H04W 4/38 |
| 2017/0372431 A1* | 12/2017 | Perl | G07C 5/085 |
| 2018/0025430 A1* | 1/2018 | Perl | G07C 5/008 705/4 |

OTHER PUBLICATIONS

H. Benitez Perez et al., "Definition and Empirical Evaluation of Voters for Redundant Smart Sensor Systems", Computacion y Sistemas, vol. 11, No. 1, pp. 39-60, Oct. 2, 2007 (13 pages).

* cited by examiner

ELECTRONIC LOGGING AND TRACK IDENTIFICATION SYSTEM FOR MOBILE TELEMATICS DEVICES, AND CORRESPONDING METHOD THEREOF

FIELD OF THE INVENTION

The present invention relates to mobile real-time systems reacting dynamically on captured environmental or operational parameters, in particular to telematics system's monitoring, capturing and reacting on motion parameters of motor vehicles during operation or mobile telematics devise in general, thereby measuring, detecting and identifying tips and trip segments of moving telematics devices. The present invention further relates to telematics based automated risk-transfer, alert and real-time notification systems for telematics associated with motor vehicles and wireless technology used in the context of telematics and automated trip measurements and recognition. Finally, the invention also relates to telematics-based real-time expert systems. The term telematics, in particular traffic telematics, refers to systems that are used for communications, instrumentation and control, and information technology in the field of telecommunication and/or transportation. Thus, the present invention relates to the use of telematics together with real-time risk-monitoring, automated risk-transfer and insurance systems based on captured and measured usage-based and/or user-based telematics data, in particular dynamically measured motion sensory parameter values.

BACKGROUND OF THE INVENTION

Modern smartphones are more than calling devices. They incorporate a number of high-end sensors that provide new dimensions to smartphone experience. The use of smartphones, however, can be extended from the usual telecommunication field to applications in other specialized fields including transportation. Sensors embedded in the smartphones like GPS, accelerometer and gyroscope can collect data passively, which in turn can be processed to infer the travel mode of the smartphone user. This can help solving many of the shortcomings associated with conventional travel survey devices and systems including biased response, no response, erroneous time recording devices, etc. In the prior art, for example, systems use the sensors' data collected by smartphones or mobile telematics devices to extract various features for classification. Parameters including data frequency, moving temporal window size and proportion of data to be captured, are dealt with to achieve better results.

Dynamically captured telematics trip data can be of crucial importance for automatically managing or steering, for example, transportation infrastructure or to assign future facilities. They also provide basis for new systems realized for Transportation Demand Management (TDM). The methods used for trip data collection have changed over time, starting with the conventional face-to-face interviews or paper-and-pencil interviews in the 1950s. High cost and safety issues proved to be the major problems in this approach. To overcome such disadvantages, computer assisted surveys were introduced in the 1980s. These surveys included computer-assisted telephone interview (CATI) and computer-assisted self-interview (CASI). The computer assisted surveys proved to be an improvement from the previous face-to-face interviews but the underlying shortcomings in person trip (PT) data collection methods still remained. These included inaccuracies in recording the starting and ending times, underreporting due to missing short trips and non-response. However, most important, there was no technical possibility for real-time systems both in monitoring and/or reacting dynamically on the motion of a person or mobile device. To address this issue, GPS technology was employed more and more during the late 1990s, providing the starting point for a generation of smart travel survey systems and devices. At the beginning, GPS surveys were carried out as supplementary surveys to assess the accuracy of traditional methods, but later total replacement was experimented. At the beginning, GPS devices were installed in vehicles. Consequently, only the travel behavior of people using vehicles could be monitored. In the early 2000s, rapid advancement in technology provided wearable GPS data loggers. With the introduction of lightweight, portable and mobile phone GPS data loggers, all modes of transportation could be monitored. Although GPS devices can very accurately record the locations and timestamps, important information like travel mode and trip purpose are not recorded. These details must technically be extracted from the GPS data and other logged telematics data by appropriate devices capable to handle continuous flow of sensory data.

In newer times, the explosive spread of smartphones has provided a new potential to utilize smartphone devices for travel data collection. Because of GPS sensors being embedded into almost all modern smartphones, it becomes possible to replace the GPS data loggers being used previously. Smartphones have an added advantage of being a necessary travel companion, hence being able to monitor the travel patterns over extended periods of time. In addition, GPS enabled smartphones are also utilized for indoor positioning and pedestrian navigation. On the other hand, GPS loggers are considered a burden to carry around. The inclusion of accelerometer in smartphones has dramatically enhanced its capability to accurately detect the travel mode and trip purpose. Accelerometer can detect accelerations along three axes (x, y and z) with respect to the gravitational force. It means that at rest, the accelerometer will register an acceleration of 9.8 m/s² along the downward direction. Orientation augments the accelerometer data by providing the information regarding angular motion. Orientation sensors are often software-based and drive their data from the accelerometer and the geomagnetic field sensor. The current focuses on trip and trip segments detection as well as travel mode detection using the continuous flow of sensory data from the GPS sensor, the accelerometer and orientation data collected by smartphones or mobile telematics devices.

One of the main targets of the present invention is to provide technical means to collect telematics data via Mobile phone or mobile telematics devices. The inventive system should be able to cope with the physical limits of the mobile devices in order to minimize both the information loss (potential car-relevant data) and the battery consumption. The system should provide the technical structure to allow implementation of appropriate logging strategies with defined measure and/or metric and/or KPI metrics. A measure herein is a defined technical and physically measurable quantification or indexing. A metric herein is a measure as a fundamental or unit-specific term but is beyond that directed performance directed measures. KPIs (Key Performance Indicator) are relevant measurable performance metrics that are measurable to the operation of devices or the same. Typically, KPIs are determined measuring over a specified time period, and compared against acceptable norms, past performance metrics or target measurement. Finally, the present invention should provide a system allowing to realize and run on an optimized, overall logging process starting from the capturing of the sensory data till the trip identification.

Typically, every driver is considered a risk taker having a measurable driving risk. Thus, driving a vehicle, almost worldwide, means that the driver somehow must or wants to transfer this risk, for example by transferring or ceding the risk by means of appropriate risk transfer systems or by auto insurance cover. The rate for the risk-transfer is normally assigned by a human expert, e.g. an auto insurance agent, deciding on whether a specific driver is a high or low-risk driver. In the prior art, the assigned human expert's rating considerations depend on only few different factors. In the following, the most common prior art risk factors are discussed: (i) One of the most important personal factors that are used to calculate a driver's risk is age. Drivers between the ages of 25 and 55 are considered to be in the prime age bracket and are considered a lower risk; (ii) Gender is another factor, since women drivers are usually considered as a lower risk in general, however this is slowly changing because more and more registered drivers are women. Single parents are also considered as less of a risk; (iii) Risk transfer systems or insurances take into consideration that a single parent is already responsible enough to parent a child alone so they are more likely to be financially responsible as well; (iv) In a similar vein, married drivers are normally rated better for their car risk-transfers or insurance policies than a single driver does. They are thought to be more stable than single drivers due the fact that they often have more responsibilities. A single driver of the same age with the same driving record as a married person will be assessed as a higher risk simply because of their marital status; (v) Also driving history plays a central role in the rating. If a driver has any type of driving violation attached to his driving history, he will be rated to a higher risk-transfer rate than someone whose driving record has no infractions. Any prior accidents that a driver has been involved in will be reflected on his driving record, which increases his risk rating. In some risk-transfer systems, even a severe penalty is put on such a driving record for up to five years after the accident has occurred. Any type of speeding ticket is normally also part of the driving history and raises a driver's risk factor. Speeding reflects carelessness and a disregard for the driving laws and official risk limits set in place by the government. Normally, risk-transfer systems will consider any type of speeding ticket as a bad reflection of the driver. This is calculated into the risk rating and will ultimately increase the rating or risk-transfer premium. Driving under the influence of alcohol or drugs, as reflected by the driving history, will not only cause a moving violation ticket, but it can also cause driver's license to become suspended or, worse case scenario, revoked. The bottom line is that, in prior art systems, the better a driving record or driving history is free of accidents, tickets, moving violations, the lower the risk rating will be which will result in lower insurance rates; (vi) Another factor is the area where the driver resides, which typically plays a major role in how a car risk-transfer is rated. Drivers who, for example, claim a residence in a larger metropolitan area run a higher risk of not only being involved in an accident but also of being the victim of vandalism or theft. Cities are congested with much more traffic than urban areas. The logic of prior art risk-transfer is that the more cars that are used in an area, the more likely they are to hit or be hit by another car. Those drivers who live in an area that has less traffic will be considered less of a risk and that helps lower their risk-transfer ratings or premiums. Specific areas may further be specifically rated as being a high crime area. If a driver lives in such an area, the risk-transfer rating will be considered at a higher rate because the vehicle will be more likely to be involved in a theft. The less of a target a vehicle is, the lower the risk rating becomes. One way to help counteract this risk is to install an anti-theft mechanism in a vehicle such as an alarm system, power locks, door locks that require a code to be unlocked, or some other device that will help to deter thieves from attacking a car. Dependent on the risk-transfer system, such measures may help to decrease a certain risk rating. Any type of anti-theft protection that is installed in a vehicle will usually also be rewarded by a decrease to the car risk rating; (vii) New vehicles are going to require more coverage than a second-hand vehicle. Sports cars are expensive to manufacture which is why they are expensive to repair in case of an accident. In summary, vehicles that have a lesser value will cost less to transfer their risks; (viii) The factor, if a vehicle is used as a personal vehicle or strictly for business, affects in many prior art systems the risk rating. In addition, the distance a driver drives to and from work every day is another factor which may be considered for the risk rating, in the prior art. The less mileage a driver accrues per year, the less of a risk he is exposed. If a driver only drive a few miles a day to reach his job site, his risk of having an accident is lower so his rating will be better; (ix) Teenage drivers are considered an extremely high risk when it comes to driving. Various prior art risk rating statistics acknowledge that teenage drivers have an extremely high crash rate due to their inexperience and lack of maturity. Vehicle accidents are often the leading cause of death for teenagers. This is another factor that is used to rate a risk to be transferred, i.e. an insurance risk; (x) In opposite to teenagers' specific rating, in some risk-transfer systems, the number of years a driver has been driving also matters. This is tied into the age factor of drivers, but some people do not always start driving as soon as they hit the legal age. A driver of the same age who has been driving for the last 10 years will be rated significantly lower because such drivers typically are considered to be less of a risk; (xi) Finally, many risk-transfer systems also use credit history. It is clear, that one of the main technical objects of risk-transfer systems is to balance the pooling of resources (e.g. premiums), which is performed typically in advance based on predicted occurrences of risk events, and the actual occurring risk events linked to actual losses to be covered. Therefore, unforeseen strikes in premiums will cause a not foreseen unbalance of the pooled resources to the actual losses, which may severely impact the operation of the risk-transfer system. However, the main reason in prior art systems for using credit history data is to obtain information that will aid in evaluating "unobservable factors", such as carefulness in driving (cf. e.g. Monaghan, J. E., 2000, The Impact of Personal Credit History on Loss Performance in Personal Lines, Casualty Actuarial Society Forum, p. 79-105; or Wu, C.-S. P. and Guszcza, J. C., 2003, Does Credit Score Really Explain Insurance Losses? Multivariate Analysis from a Data Mining Point of View, Proceedings of the Casualty Actuarial Society, p. 113-138). For assessing risks by using credit history, prior art risk-transfer systems assess either by a human expert or by appropriate data processing and filtering means a so-called "insurance score" for each potential insured by weighting certain characteristics from the driver's credit history, for example, delinquent loan payments and number, if any, of collection actions (see above Monaghan, 2000, p. 82-86). The underlying credit record is obtained from large national credit information providers. The risk-transfer systems or the insurer, uses the score thus derived in combination with other factors to evaluate the driver's automobile risk-transfer rate.

Starting from the above traditional risk assessment of the prior art systems using mainly statistically based structures by appropriate class factors, e.g. age, gender, marital status, number of driving years etc., such assessments necessarily lead to preferred class ratings with the corresponding deficiencies in providing the correct risk for a specific driver. Statistical based structures are always linked to mean values and means assumptions. However, not all teen drivers bear a higher risk, as for example drivers in the age of thirty. A very skilled driver may have a lower risk at a speed of 50 km/h, as another driver by 30 km/h on the same road. The deficiencies of the prior art assumptions lay in the fact, that they contract all driver of a certain class to the means assumption of the class, while, in fact, this is only absolutely true for a very minor part of a certain class, while the predominant remaining members of the class typically are distributed in Poisson distribution around the means value, i.e. for this predominant remaining part, the assumption is more or less wrong leading to a probably unfair risk rating of the driver. There could be argued, that using the driving history data, the prior art systems allow a certain individualization, and therefore a correction of the deficiencies of their statistical based class structure. However, the driving history data are always historical data, which are interpolated to future behavior of the driver, presuming, that a driver always behave the same and that the environmental conditions always stay the same. In reality, this is not true. Drivers are aging, drivers may learn from situations, drivers may change their behavior, e.g. change the place of work or stop drinking etc. The same applies, for example, to speeding ticket. The legal speed limits are normally put to a level, where driving is assumable save for all drivers (old/young, skilled/unskilled etc.). From the standpoint of the actual measurable risk associated with a driver, a very skilled driver having speeding tickets in his driving history may have a lower driving risk, that another driver with a proper driving history. For example, an overtake maneuver, performed at a higher speed and probably leading to a speed ticket may be associated with a much lower risk, that the same overtaking maneuver at a lower speed. Finally, the classifying filtering of drivers by their credit history is completely unrelated to the actual occurring measurable driving risk. In summary, the prior art systems risk predictions and ratings are afflicted with major deficiencies in relation to the actual occurring driving risk. Thus, it is a high demand on reliable, automated risk assessment and risk-transfer systems in the field of automobile risk-transfer industry, considering both liability and comprehensive risk-transfer. The field of automobile risk-transfer is characterized by high competitive pressure as well as high combined ratios and, hence, by low profitability (cf. e.g. GDV, 2006, Jahrbuch 2006—Die deutsche Versicherungswirtschaft, Gesamtverband der Deutschen Versicherungswirtschaft e.V., Berlin). Thus, there is a high demand to provide automatable systems, even in the complex sector of physically measuring of typically (i.e. by prior art systems) not measurable risks and system-based, automated risk-transfer.

In summary, it has to be hold, that telematics data capturing by mobile devices, as e.g. mobile cellular phone, is extremely demanding and not solved by the prior art system. In contrast to telematics devices, which are, e.g., fixed build in or integrated in vehicles, as e.g. showed by so called connected cars (e.g. by means of Open Automotive Alliance (OAA) or CarPlay (Apple) technology), and whose telematics sensing devices keep their sensing position and direction in respect to the moving vehicle, mobile devices as smart phones tend to change their orientation in respect to the moving direction, as they may be hold by a person with in the vehicle, having independent movements from the car moving direction. Capturing telematics data from such a mobile telematics device and identifying/distinctly allocating tracks or other movements with such measuring data is technically extremely difficult and typically cannot be performed in real-time or nearly real-time by such small mobile devices as smart phones. Another problem is, that such real-time or nearly real-time measurements or tracking typically is joint by a high energy consumption and data processing capacity, which can normally not be provided by small mobile devices.

SUMMARY OF THE INVENTION

It is one object of the present invention to provide to provide technical means to collect telematics data via mobile phone or mobile telematics devices. The inventive system should be able to cope with the physical limits of the mobile devices in order to minimize both the information loss (potential car-relevant data) and the battery consumption. The system should provide the technical structure to allow implementation of appropriate logging strategies with defined measure and/or metric and/or KPI metrics. A measure herein is a defined technical and physically measurable quantification or indexing. A metric herein is a measure as a fundamental or unit-specific term but is beyond that directed performance directed measures. KPIs (Key Performance Indicator) are relevant measurable performance metrics that are measurable to the operation of devices or the same. Typically, KPIs are determined measuring over a specified time period, and compared against acceptable norms, past performance metrics or target measurement. Finally, the present invention should provide a system allowing to realize and run on an optimized, overall logging process starting from the capturing of the sensory data till the trip identification. In particularly, the present invention shall provide a real-time or nearly real-time logging system based on mobile phone telematics data measurements and capturing cleaning the measured telematics data and allocating/identifying tracks/trips, without being affected by a moving position or orientation of the mobile phone and being able to cope with the limited technical sources of a mobile phone as limited energy resources and data processing capacities. In addition, the system should be enabled to base its operation resp. track/trip identication solely based on measured accelerometer sensory data and a Global Positioning System (GPS) sensory data and/or a gyroscope sensory data of a mobile phone.

Further, it is one object of the present invention to provide mobile systems reacting, in real-time, dynamically on captured motion, environmental or operational parameters of mobile telematics devise and/or motor vehicles during operation, in particular allowing a user to dynamically and in real-time adapt vehicle's operation or driving risks by means of an automated risk-transfer engine allowing to dynamically select appropriate risk-transfer profiles based on monitoring, capturing and reacting on automotive parameters of motor vehicles during operation. In particular, it is an object of the invention to provide a dynamic measuring system for dynamic trip or trip segment identication and detection, e.g. used for driver score measurements and driving risk measurements. In contrast to prior art systems, the telematics system should be able to provide a dynamic trip identification and detection measurement based on measured actual sensory data, for example capable of linking accident causation data to relevant risk factors (e.g. overtake, breaking with lane changes, driver behavior at the intersection, etc.) based on actual driver behavior data instead of traditional risk factors such as age, postal code, etc. More particular, it is an object of the present invention to extend the existing technology to a dynamic triggered and dynamically adjustable, multi-tier risk-transfer system based on a dynamic adaptable or even floating first-tier level risk-transfer, thereby reinforcing the importance of developing automated systems allowing self-sufficient, real-time reacting operation. Another object of the invention seeks to provide a way to technically capture, handle and automate dynamically adaptable, complex and difficult to compare risk transfer structures by the user and trigger operations that are related to automate optimally shared risks and transfer operations. Another object of the invention seeks to dynamically synchronize and adjust such operations to changing environmental or operational conditions by means of telematics data invasive, harmonized use of telematics between the different risk-transfer systems based on an appropriate technical trigger structure approach, thus making the different risk-transfer approaches comparable. In contrast to standard practice, the resource pooling systems of the different risk-transfer system shall create a comparable risk-transfer structure, allowing to optimize risk-transfer operation with the desired, technically based, repetitious accuracy that relies on technical means, process flow and process control/operation. Along the automated risk-transfer telematics value chain, there are many technologies offering individual elements, however, it is a further object of the present invention to provide a technical solution that is technically able to cover the whole range from device installation and data capturing to the automated and accurate risk measuring, analysis and management. Finally, it is a further object of the invention to provide a dynamic, expert scoring system based on real-time scoring and measurements, and further to provide a technically scalable solution based on scoring algorithms and data processing allowing to adapt and compare the signaling to other field of automated risk-transfer.

According to the present invention, these objects are achieved, particularly, with the features of the independent claims. In addition, further advantageous embodiments can be derived from the dependent claims and the related descriptions.

According to the present invention, the above-mentioned objects for the electronic logging and track detection system for mobile telematics devices based on dynamically measured telematics data are achieved, particularly, in that, by means of the present invention, instantaneous movement telematics data from sensors of the mobile telematics devices are logged and trips and/or trip-segments based on the instantaneous movement sensory telematics data are automatically identified and detected, wherein the telematics devices capture usage-based and/or user-based and/or operation-based telematics data, in particular motion related telematics data by means of the sensors, and wherein the telematics devices comprise one or more wireless connections, the telematics device acting as a wireless node within a corresponding data transmission network by means of antenna connections of the telematics device, in that the plurality of mobile telematics devices capturing the instantaneous movement telematics data from their sensors are connected to a dynamic trip-detection telematics circuit, wherein a data link is set by means of the wireless connection between the dynamic trip-detection telematics circuit transmitting at least telematics data based on the captured usage-based and/or user-based and/or operational-based telematics data from the mobile telematics devices to the dynamic trip-detection telematics circuit, and wherein the telematics sensors at least comprise an accelerometer sensor and a gyroscope sensor and a Global Positioning System (GPS) sensor, in that for trips and/or trip-segments identification, each measurement of the instantaneous movement telematics data is captured and assigned to a measured time stamp by means of a polling device, wherein the measurements of the telematics data are provided in an interval sensing within a defined time interval between two sensing steps, in that, by means of an adhoc classifier module, a motion status signal is dynamically generated automatically triggering significant movements of the mobile telematics device and providing a measure for discriminating between dormant and sensing phase with streaming signals by the sensors, wherein the sensing phase is automatically interrupted, if the measured status signal switches to no significant movements of the mobile telematics device, in that, the adhoc classifier module comprises a data buffer unit buffering a defined range of contiguous sets of motion status signals from the captured telematics data, removing spurious assignment by triggering only commonest motion status signals of a given set of the data buffer unit by their highest frequency based on a majority voting structure of the adhoc classifier module, in that the sets of motion status signals, processed by the adhoc classifier module, are transferred to the dynamic trip-detection telematics circuit, wherein points of the sets are automatically assigned to one of defined categories of roads and/or to a measured distance of the point to the closest road of a specific category by means of a trip-detection core engine, and wherein in case of a measured distance, one of the defined categories of roads is only assigned, if a measured distance is triggered within a given threshold value, and in that the sets of motion status signals with the road-type assigned points are time dependently piped in a trip buffer element of the trip-detection core engine for assessing their membership to a trip or trip segment, wherein to detect when a trip is finished, a trip contiguity is measurably determined over the sets of motion status signals buffered in the trip buffer element measuring the time difference of the timestamp of the last point belonging to buffered preceding set of motion status signals to the timestamp of the first point of the subsequent set of motion status signals, and wherein if the time difference is lower a time threshold value the two sets of motion status signals are assigned to the same trip and/or trip segment, while otherwise the trip and/or trip segment is triggered as finished. The triggered threshold value for the measured distance can e.g. be set to 4 meters or smaller than 10 meters. The time threshold value can e.g. be set equal or less 2 minutes. Preferably, the mobile telematics devices can e.g. be associated with or integrated in a plurality of mobile cellular phones. However, the mobile telematics devices can e.g. also be associated with a plurality of motor vehicles. The present invention has, inter alia, the advantage that, it allows an independent, real-time trip identication, detection and recognition in dynamic traffic behavior, id est, a real-time pattern recognition of dynamically captured trip sensory logs. Further, in the present invention, the operation to monitor such amending condition related to movements of the mobile telematics devices doesn't drain battery amperage. The invention allows a new way of minimizing battery consumption, while the ad hoc classifier has been designed, appropriately. Despite a continuous logging of sensors seems to be feasible from a mere realization point of view, this might be completely unfeasible both from battery management point of view and stability aspects. The inventive system allows a new way of optimization without losing the accuracy in trip or trip segment identification, detection and recognition.

In an embodiment variant, the frequencies for which the sensors are logged are set to 1 Hz for the GPS sensor and/or 50 Hz for accelerometer sensor and/or 50 Hz for the gyroscope sensor. This embodiment variant has inter alia the advantage, that it provides a further optimization of sensory data accuracy and battery consumption.

In another embodiment variant, at the end of the sensing phase of the time sequential telematics data sensing, the polling device assesses the status of the mobile device determining when the data sensing should be triggered again, wherein the polling device exploits the continuous cyclic background running of the adhoc classifier module, providing a variable waiting time, in order its sensing phase to become again active. As a variant, at the end of the sensing phase of the time sequential telematics data sensing, the polling device assesses the status of the mobile device determining when the data sensing should be triggered again, wherein the polling device triggers an effective sleep of the adhoc classifier module during the logging phase, generating a direct call to the adhoc classifier module once the measured status signal switches to significant movements of the mobile telematics device. Further, the majority voting structure of the adhoc classifier module can e.g. be at least based on triggering the winning status of the previous set as basic majority voting structure, wherein if the winning status of the previous package belongs to the current set of winners, than the winning status is confirmed as winner for the current set, while otherwise a random selection from the current set of winners is performed by means of the adhoc classifier module. The majority voting structure of the adhoc classifier module can e.g. be at least based on triggering the winning status of the previous set as double majority voting structure, wherein if the winning status of the previous package belongs to the current set of winners, than the winning status is selected as winner for the current set, while otherwise a random selection from the current set of winners is performed by means of the adhoc classifier module, and wherein the selection is performed two-fold in cascade by means of the adhoc classifier module. As variant, the majority voting structure of the adhoc classifier module can e.g. be at least based on triggering the winning status of the previous set as selective majority voting structure, wherein if the winning status of the previous package belongs to the current set of winners, than the winning status is selected as winner for the current set, while otherwise a random selection from the current set of winners is performed by means of the adhoc classifier module, and wherein the selection is performed by means of the adhoc classifier module in an incremental way only if the current selection is different from the previous one. The majority voting structure of the adhoc classifier module can e.g. also be at least based on triggering the winning status of the previous set as half-selective majority voting structure, wherein if the winning status of the previous package belongs to the current set of winners, than the winning status is selected as winner for the current set, while otherwise a random selection from the current set of winners is performed by means of the adhoc classifier module, and wherein the selection is performed by means of the adhoc classifier module in an incremental way only if the current selection is different from the previous one, and wherein the half-selective majority voting structure is only applied to half of a previous set of the data buffer unit. Further, the majority voting structure of the adhoc classifier module can e.g. be at least based on triggering the winning status of the previous set as time-weight majority voting structure, wherein if the winning status of the previous package belongs to the current set of winners, than the winning status is confirmed as winner for the current set, while otherwise a random selection from the current set of winners is performed by means of the adhoc classifier module, and wherein each part of a set of the data buffer unit is assigned a weight privileging parts of the set lying in latest position of the package, thereby implementing a preference of more recent classifications with respect to older ones. Finally, the majority voting structure of the adhoc classifier module can e.g. be at least based on triggering the winning status of the previous set as confidence-weight majority voting structure, wherein if the winning status of the previous package belongs to the current set of winners, than the winning status is confirmed as winner for the current set, while otherwise a random selection from the current set of winners is performed by means of the adhoc classifier module, and wherein each part of a set of the data buffer unit is assigned a weight privileging parts of the set wherein the weight corresponds to the confidence of the class prediction, as provided in output by the decision tree classifier of the confidence-weight majority voting structure. It is to be noted, that the adhoc classifier module can e.g. also explicitly be based on any combination of the majority voting structures, discussed above. Trips or trip segments on roads, highways or other car tracks, typically consisting of one or a plurality of traffic lanes, and can be characterized by complex trip pattern and trip scenes involving various impacting contextual and environmental condition. This includes wrongly recognizing trips of all surrounding pattern etc. However, identification and interpretation of trips and trip segments will become key elements of modern driver assistance systems as well as modern risk measuring and assessment systems. Considerable effort has been put into early recognition of trips and trip segments and a number of technical challenges have been identified preventing the realization of appropriate systems for trip detection. There are two main reasons why potentially trip detection represent a technical challenge for the early proactive recognition: (i) The situations develop quickly over time, and an automatic system will therefore require information captured in the order of very short time frames, (ii) trips can only be reliably recognized when considering the joint behavior of several sensor measurements simultaneously. In the present invention, the measured and dynamically captured sensory data can include both measuring parameters on the motion state of the current mobile telematics device or associated vehicle (e.g., position, speed, acceleration, orientation within the lane, trajectory, as well as measuring parameters and appropriate information from the environment like lane markings and road borders. The above embodiment variant has inter alia the advantage, that it provides an even further optimization of sensory data accuracy, battery consumption and trip detection accuracy.

Related to a possible scoring, the variable driving scoring parameter can e.g. at least be based upon the detected, measured and recognized trips and/or trip segments, measures of driver behavior parameters comprising speed and/or acceleration and/or braking and/or cornering and/or jerking, and/or a measure of distraction parameters comprising mobile phone usage while driving and/or a measure of fatigue parameters and/or drug use parameters. The variable contextual scoring parameter can e.g. at least be based upon measured trip score parameters based on road type and/or number of intersection and/or tunnels and/or elevation, and/or measured time of travel parameters, and/or measured weather parameters and/or measured location parameters, and/or measured distance driven parameters. The variable vehicle safety scoring parameter can e.g. at least be based upon measured ADAS feature activation parameters and/or measured vehicle crash test rating parameters and/or measured level of automation parameters of the motor vehicle and/or measured software risk scores parameters. The plurality of individualized risk-transfer profiles provided by the automated risk-transfer supplier systems can e.g. time-dependently vary based on the measured driving maneuvers and/or time-dependent use and/or style and/or environmental condition of driving by means of the triggered, captured, and monitored operating parameters or environmental parameters during operation of the motor vehicle. The automated risk-transfer supplier systems can comprise associated automated first risk-transfer systems to provide a first risk-transfer based on first risk transfer parameters from the motor vehicle to the respective first risk-transfer system, wherein the first risk-transfer system comprises a plurality of payment transfer modules configured to receive and store first payment parameters associated with risk-transfer of risk exposures of said motor vehicles for pooling of their risks. The risk-relevant parameters of the shadow request can e.g. at least comprise parts of the generated single or set compound of variable scoring parameters and/or at least parts of the usage-based and/or user-based and/or operating telematics data captured by means of the mobile telematics device. The one or more wireless connections or wired connections of the vehicle embedded telematics devices (OEM line fitted) can e.g. comprise Bluetooth or Bluetooth LE and/or Wi-Fi and/or WiMAX and/or laser-based high-speed wireless connection, for example using a light-bulb-shaped detector with orthogonal frequency-division multiplexing, as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities or Bluetooth LE (Low Energy) and/or 3G or 4G and/or GPS and/or GPRS and/or BT based on Wi-Fi 802.11 standard and/or WiMAX, and/or a contactless or contact smart card, and/or a SD card (Secure Digital Memory Card) or another interchangeable non-volatile memory card.

As mentioned, a mobile cellular phone may comprise the mobile telematics device integrated or having access to the sensors and measuring devices and/or vehicle embedded telematics devices and/or on-board diagnostic system and/or in-car interactive device e.g. comprising proprioceptive sensors and/or measuring devices for sensing the operating parameters of the motor vehicle and/or exteroceptive sensors and/or measuring devices for sensing the environmental parameters during operation of the motor vehicle. The on-board sensors and measuring devices can e.g. comprise at least a GPS module (Global Positioning System) and/or geological compass module based on a 3-axis teslameter and a 3-axis accelerometer, and/or gyrosensor or gyrometer, and/or a MEMS accelerometer sensor comprising a consisting of a cantilever beam with the seismic mass as a proof mass measuring the proper or g-force acceleration, and/or a MEMS magnetometer or a magnetoresistive permalloy sensor or another three-axis magnetometers. The defined risk events associated with transferred risk exposure of the motor vehicles can, for example, at least comprise transferred risk exposure related to liability risk-transfers for damages and/or losses and/or delay in delivery, wherein the occurred loss is automatically covered by the first risk-transfer system based on the first risk transfer parameters and correlated first payment transfer parameters (if a requested risk-transfer is not rejected by the system at this time). The exteroceptive sensors or measuring devices can, for example, comprise at least radar devices for monitoring surrounding of the motor vehicle and/or LIDAR devices for monitoring surrounding of the motor vehicle and/or global positioning systems or vehicle tracking devices for measuring positioning parameters of the motor vehicle and/or odometrical devices for complementing and improving the positioning parameters measured by the global positioning systems or vehicle tracking devices and/or computer vision devices or video cameras for monitoring the surrounding of the motor vehicle and/or ultrasonic sensors for measuring the position of objects close to the motor vehicle. For providing the wireless connection, the mobile telecommunication apparatus can e.g. act as wireless node within a corresponding data transmission network by means of antenna connections of the vehicle embedded telematics devices (OEM line fitted), in particular mobile telecommunication networks as e.g. 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The mobile telematics device can e.g. be connected to an on-board diagnostic system and/or an in-car interactive device, wherein the mobile telematics devices capture usage-based and/or user-based and/or operational telematics data of the motor vehicle and/or user. Further, the mobile telematics devices can e.g. be connected to an in-car interactive device and/or on-board diagnostic system, wherein the vehicle's speed and travel distances is monitored by a global positioning system (GPS) circuit and wherein the telematics data are transmitted via the mobile telematics device or the cellular phone as mobile telematics device to the central, expert-system based circuit by means of a cellular telecommunication connection. The mobile telematics devices can e.g. provide the one or more wireless connections by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit. The plurality of interfaces of the mobile telecommunication apparatus for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices, or also OEM (Original Equipment Manufacturer) installed systems getting information access to on-board sensors or entertainment systems (as e.g. Apple Carplay etc.) providing the necessary vehicle sensor information.

The dynamic trip-detection telematics circuit can further comprise an aggregation module providing the risk exposure for one or a plurality of the pooled risk exposed motor vehicles based on the captured risk-related telematics data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk exposed motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters dynamically are generated based upon the ratio of the aggregated loss parameter and the aggregated payment parameter. The first and second risk-transfer system can e.g. be fully automated steered, triggered, signaled, and mutually activated by means of the dynamic time warping based telematics circuit, wherein the steering, triggering, signaling and activating is based on the dynamic-adaptable first and second risk transfer parameters and the correlated first and second payment transfer parameters, providing a self-sufficient risk protection for the variable number of motor vehicles associated with the dynamic accident causation and accident risk measuring system and platform by means of the coupled first and second risk-transfer system. In the context of the first- and second risk-transfer tier, the first risk-transfer system can e.g. comprise an automated first resource pooling system and the second risk-transfer system comprises a automated second resource pooling system, wherein the risk exposed motor vehicles are connected to the first resource pooling system by means of a plurality of payment transfer modules configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer modules configured to receive and store second payment parameters from the first insurance system for adopting of a portion of the risk exposures accumulated by the first risk-transfer system, and wherein, in the case of the occurrence of one of defined risk events the occurred loss is automatically covered by the expert-system based automotive car system.

The present invention is able to provides an automated risk-transfer system for all kinds of risk-transfer schemes, as e.g. motor or product liability (re-)insurance systems and/or risk-transfer systems related to or depending on partially or fully automated vehicles. Also, the present invention provides a holistic and unified, automated technical approach for coverage to the motor vehicles in all different structures of risk-transfer, as e.g. product liability for car and/or technology manufacturer, driver liability cover. Further, the present invention also provides a holistic technical solution that covers the whole range from automotive control circuits and/or telematics devices and/or app installations to the automated and accurate risk measuring, analysis and management. Finally, it is able to provide a dynamic real-time scoring and measurements, and further provides a technically scalable solution based on scoring algorithms and data processing allowing to adapt the signaling to other fields of automated risk-transfer. The present invention, which is enhanced by contextual data, is able to provide best and highest optimized technical solution to the real-time adapted multi-tier risk-transfer system. It allows to capture and control the driver score behavior, and compare its behavior within the technical operation and context. It allows to automatically capture risk's scores according to location and detected trip, and to automatically analyze and react on data related to the need of value added services, as e.g. accident notifications and/or feedback to the driver and/or automated fleet risk reporting and/or automated and dynamically optimized underwriting etc.). As embodiment variant, the score driving module can e.g. automatically capture scores risks according to a measured maintenance (e.g. maintenance failure by owner) and surveillance factor extracted from the automotive data associated with the motor vehicle or the use of active safety features. The telematics based feedback means of the system may e.g. comprise a dynamic alert feed via a data link to the motor vehicle's automotive control circuit, wherein the central, expert-system based circuit heads up device alerts drivers immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. The dynamic accident causation and accident risk measuring system provides the opportunities for risk-adaption and improvement dynamically and in real-time, i.e. as and when they happen, related to the motor vehicle's risk patterns (e.g. location, speed, etc.). Providing instant feedback to drivers through heads up training aids and get information sent straight to the mobile telematics device, ensures a two pronged approach to correcting risky (and often expensive) driving habits. Thus, the dynamic accident causation and accident risk measuring system not only allows to mutually optimize the operational parameters of the first and second risk transfer system, but also optimize the risk and/or risk behavior on the level of the risk exposed motor vehicles. No prior art system allows such an integral, real-time optimization. As another value added service, the automotive car system can e.g. dynamically generated fleet risk reports of selected motor vehicles. Such fleet reports, automatically generated by the automotive car system, provide a new approach to share and compare vehicles' statistics. The proposed invention with e.g. prefunding automotive enabled risk-transfer ((re)insurance) means will stimulate the carriers (first-tier risk-transfer systems) to provide its automotive data and claims' histories to the second-tier risk-transfer system in order to continually improve its scoring service, which in turn benefits carrier in helping reduce costs and combined ratio.

In one alternative embodiment, the dynamic trip-detection telematics circuit comprises a table with stored categorization trigger parameters for triggering a predefined level of scores, wherein the first and second risk transfer parameters and the correlated first and/or second payment transfer parameters are dynamically adapted and/or accumulated by means of the central, expert-system based circuit based on the triggered categorization of the driving motor vehicles during usage and based upon the usage-based and/or user-based and/or operational automotive data captured from the plurality of driving motor vehicles. This embodiment has, inter alia, the advantage that it allows to provide new and unified approach for automated risk-transfer for risk associated with risk-exposed motor vehicles, considering dynamically measured, usage-based parameters, allowing a new optimization in the level of the risk-exposed vehicle as well as on the level of the operational pooling of risk-exposure of the first and/or second risk-transfer system.

In one alternative embodiment, the driving score module triggers and automatically selects score driving parameters based on defined score driving behavior pattern by comparing captured telematics data with the defined score driving behavior pattern. The score driving module can further e.g.

automatically capture scores risks according to the measured location or trip of the motor vehicle based on the captured telematics data of the mobile telematics device. This alternative embodiment has, inter alia, the advantage that it allows to provide a real-time adapted multi-tier risk-transfer system. Further, it allows to capture and/or control the score driving behavior (also in the sense of location, time, road etc. of the driving), and compare its behavior within the technical operation and context. It allows to automatically capture score risks according to location and/or detected trip, and to automatically analyze and react on data related to the need of added services, as e.g. accident notifications).

In another alternative embodiment, the switching device comprises capturing means for capturing a transfer of payment from the first risk-transfer system to the second payment-transfer module, wherein the second layer trigger structure of the system is activatable by triggering a payment transfer matching a predefined activation threshold parameter. In another embodiment variant, in the case of triggering the occurrence of a loss associated with the occurrence of the defined risk events, a predefined defined portion of the occurred loss covered by the second insurance system based on the second risk transfer parameters and correlated second payment transfer parameters. Thus, the present invention can be realized with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, in case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can e.g. be based on a Per Risk XL (Working XL), Per Occurrence/Per Event XL (Catastrophe or Cat XL), or Aggregate XL structure. As a more particular alternative embodiment, a periodic payment transfers from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In still another alternative embodiment, the dynamic trip-detection telematics circuit comprises means for processing risk-related trip detection data and driving motor vehicle data and for providing data regarding the likelihood of said risk exposure for one or a plurality of the pooled risk exposed motor vehicle, in particular, based on the risk-related motor vehicle data, and wherein the receipt and preconditioned storage of payments from the risk exposed motor vehicles for the pooling of their risks can be dynamically determined based on the total risk and/or the likelihood of risk exposure of the pooled risk-exposed motor vehicles. This alternative embodiment has, inter alia, the advantage that the operation of the first and/or second resource pooling system can be dynamically adjusted to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk exposed motor vehicles is directly related to the total pooled risk. However, it is important to note, that the present invention does not necessarily have to lead to adjusted pricing or premiums. For example, it could also automatically provide coupons to automated motor vehicles driving in low risk regions, or that nothing at all changes but that the system uses the automotive data to automatically decide if the risk-transfer is continued the next year. The present invention can also exclusively be used for automatically providing and activating adapted and/or specifically selected value added services, as e.g. accident notifications and/or feedback to the motor vehicle or driver and/or automated fleet risk reporting and/or automated and dynamically optimized underwriting etc. Thus, the present invention allows an adaption of the risk of the first risk-transfer tier or system as well as risk on level of the insured motor vehicles (e.g. by risk-based driver feedback in real-time) and/or the second risk-transfer tier or system. There is no prior art system, allowing such an optimization and/or adaption. The feedback can e.g. be generated by comparing the motor vehicle's profile and pattern with other motor vehicle's profiles or pattern at the same location and/or comparable conditions.

In one alternative embodiment, the system comprises means for processing risk-related component data and for providing information regarding the likelihood of said risk exposure for one or a plurality of the pooled risk exposed motor vehicles, in particular, based on risk-related trip detection and/or motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and wherein the total allocated payment is transferrable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example be dependent on the stage of the occurrence of a risk event, as triggered by the system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
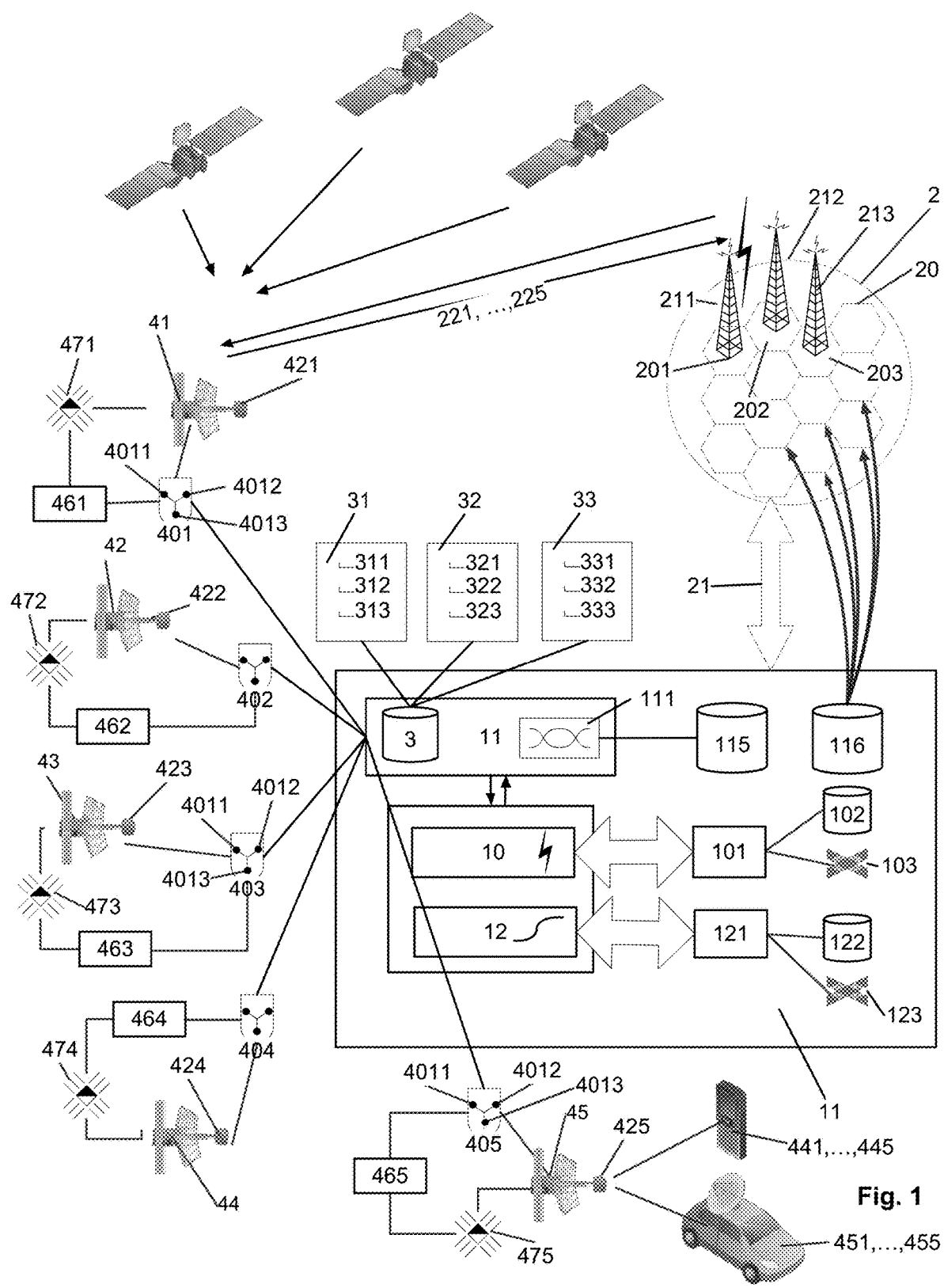
FIG. 1 shows a block diagram schematically illustrating an electronic logging and track detection system 1 for mobile telematics devices 41, . . . , 45. Instantaneous movement telematics data 3 are measured by and logged from sensors 401, . . . , 405 of the mobile telematics devices 41, . . . , 45. Trips and/or trip-segments based on the instantaneous movement sensory telematics data 3 are automatically identified and detected. The telematics devices 41, . . . , 45 capture usage-based 31 and/or user-based 32 and/or operation-based 33 telematics sensory data 3 by means of the sensors 401, . . . , 405. The telematics devices 41, . . . , 45 comprise one or more wireless connections 421, . . . , 425, wherein the telematics devices 41, . . . , 45 act as a wireless nodes 221, . . . , 225 within a corresponding data transmission network 2 by means of antenna connections of the telematics device 41, . . . , 45.

FIG. 1 schematically illustrates an architecture for a possible implementation of an embodiment of the electronic logging and track detection system 1 based on dynamically measured telematics data 3, in particularly dynamically measuring motion sensory data, capturing motion of the telematics devices 41, ..., 45 thereby individuate trips and/or tip segments 108. The dynamically measured and detected tips and/or trip segments 108 can, for example, be used to perform an output signal generation based upon detected tips and/or trip segments 108 and/or further risk measure parameters and/or crash attitude measure parameters. The electronic logging and track detection system 1 is able to react in real-time, dynamically on captured motion and/or environmental measuring parameters 3, in particular on monitored and captured telematics parameters 3 of the telematics devices 41, ..., 45 during motion or movement of the telematics devices 41, ..., 45. The mobile telematics devices 41, ..., 45 can e.g. be associated with a plurality of mobile cellular phones 441, ..., 445, for example realized as integrated part of the mobile cellular phones 441, ..., 445. However, the mobile telematics devices 41, ..., 45 can e.g. also be associated with a plurality of motor vehicles 451, ..., 455 or any moving device or object. The present invention further is able to provide a telematics based automated risk-transfer, alert and real-time notification systems for motor vehicles 451, ..., 455 and wireless technology used in the context of telematics. Finally, the present system 1 also provides telematics-based real-time expert systems taking all spatio-temporal dependencies into account including multiple, interacting trips and/or trips segments 108. Furthermore, the automated trip detection can be used to provide robustly predicted vehicle's trajectories, for example, even under real-time performance of dynamic driving trips, which can be used not only for risk measuring and prediction but also for realizing advanced driver assistance systems (ADAS). Thus, the inventive system 1 provides a structure for the use of telematics together with real-time trip and/or trip segment measurement, identication, detection, and recognition, related risk-monitoring and automated risk-transfer systems based on captured and measured telematics data 3.

As mentioned, the mobile telematics device 41, ..., 45 can be at least partially realized as part of mobile phone device/mobile smart phone devices 441, ..., 445. The mobile telematics device 41, ..., 45 can comprise on-device sensors and measuring devices 401, ..., 405. However, the mobile phone device/mobile smart phone devices 441, ..., 445 or the mobile telematics device 41, ..., 45 can also comprise one or more data transmission connection 4131 to vehicle-based telematics sensors 411, ..., 415 as on-board sensors and measuring devices of the motor vehicle 451, ..., 455 and/or an on-board diagnostic system 4141 and/or an in-car interactive device 4151 of a motor vehicle 451, ..., 455. The sensors and measuring devices 401, ..., 405 of the mobile telematics device 41, ..., 45 or the mobile phone device/mobile smart phone devices 441, ..., 445 can at least comprise an accelerometer sensor or measuring device 4011 and a gyroscope sensor or measuring device 4012 and a Global Positioning System (GPS) sensor or measuring device 4013. The vehicle-based telematics sensors 411, ..., 415 as on-board sensors and measuring devices of the motor vehicle 451, ..., 455 can e.g. comprises proprioceptive sensors 4121 for sensing operating parameters 41121 of the motor vehicle 451, ..., 455 and/or exteroceptive sensors 4111 for sensing environmental parameters 41111 during operation of the motor vehicle 451, ..., 455. The exteroceptive sensors or measuring devices 4111 can, for example, comprise at least radar devices 41117 for monitoring surrounding of the motor vehicle 451, ..., 455 and/or LIDAR devices 41115 for monitoring surrounding of the motor vehicle 451, ..., 455 and/or global positioning systems 41122 or vehicle tracking devices for measuring positioning parameters of the motor vehicle 451, ..., 455 and/or odometrical devices 41114 for complementing and improving the positioning parameters measured by the global positioning systems 41112 or vehicle tracking devices and/or computer vision devices 41116 or video cameras for monitoring the surrounding of the motor vehicle 451, ..., 455 and/or ultrasonic sensors 41113 for measuring the position of objects close to the motor vehicle 451, ..., 455. The proprioceptive sensors or measuring devices 4112 for sensing operating parameters 41121 of the motor vehicles 451, ..., 455 can at least comprise motor speed and/or wheel load and/or heading and/or battery status of the motor vehicles 451, ..., 455. The one or more wireless connections or wired connections 421, ..., 425 of the mobile telematics devices 41, ..., 45 can e.g. comprise Bluetooth (IEEE 802.15.1) or Bluetooth LE (Low Energy) as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on Wi-Fi 802.11 standard, and/or a contactless or contact smart card, and/or a SD card (Secure Digital Memory Card) or another interchangeable non-volatile memory card.

For providing the wireless connection 421, ..., 425, the mobile telematics devices 41, ..., 45 can e.g. act as wireless node within a corresponding data transmission network by means of antenna connections, in particular, as mentioned, mobile telecommunication networks as e.g. 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The mobile telematics devices 41, ..., 45 can e.g. be connected to an on-board diagnostic system 4141 and/or an in-car interactive device 4151, wherein the mobile telematics devices 41, ..., 45 capture usage-based 31 and/or user-based 32 and/or operational telematics data 3 of the motor vehicle 451, ..., 455 and/or user. The mobile telematics devices 41, ..., 45 can e.g. provide the one or more wireless connections 421, ..., 425 by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit. The plurality of interfaces of the mobile telecommunication apparatus 441, ..., 445 for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices, or also OEM (Original Equipment Manufacturer) installed systems getting information access to on-board sensors or entertainment systems (as e.g. Apple Carplay etc.) providing the necessary vehicle sensor information. The measured operating parameters 41121 and/or environmental parameters 41111 during operation of the motor vehicle 451, ..., 455 can e.g. comprise time-dependent speed measuring, hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system is able to process such a variety of dynamic-monitored, risk-relevant data. The advantage of the generated score parameters mirrors the captured sensory data in that the data components of the score can even e.g. comprise: customer policy details, individual driving data, crash forensics data, credit scores, statistical driving data, historic claims data, market databases, driving license points, statistical claims data, context data of weather or road type or surrounding.

The electronic logging and track detection system 1 for mobile telematics devices 41, ..., 45 comprises at least the sensors 401, ..., 405, wherein instantaneous movement telematics data 3 are measured by and logged from sensors 401, ..., 405 of the mobile telematics devices 41, ..., 45 and trips and/or trip-segments based on the instantaneous movement sensory telematics data 3 are automatically identified and detected. The telematics data 3 comprise usage-based 31 and/or user-based (32) and/or operation-based 33 sensory data 3, however, at least comprise sensory data form an accelerometer sensor 4011, a gyroscope sensor 4012, and a Global Positioning System (GPS) sensor 4013, the Global Positioning System (GPS) sensor 4013 measuring location data 40131 assigned with a time stamp 40132. The telematics devices 41, ..., 45 comprise one or more wireless connections 421, ..., 425, the telematics device 41, ..., 45 acting as a wireless node 221, ..., 225 within a corresponding data transmission network 2 by means of antenna connections of the telematics device 41, ..., 45. As already described, the plurality of mobile telematics devices 41, ..., 45 capturing the instantaneous movement telematics data 3 from their sensors 401, ..., 405 are connected to a dynamic trip-detection telematics circuit 10. A data link 21 is set by means of the wireless connection 411, ..., 415 between the dynamic trip-detection telematics circuit 10 transmitting at least telematics data based on the captured usage-based 31 and/or user-based 32 and/or operational-based 33 telematics data 3 from the mobile telematics devices 41, ..., 45 to the dynamic trip-detection telematics circuit 10. For the inventive system 1 and the operational realization of the dynamic trip and/or trip segment measurement, detection and recognition, (A) A point $\rho$ is defined as a measuring parameter vector of features characterized by (i) Time Stamp and GPS (lat,lon) which are mandatory attributes for the operation of system 1, and (ii) a set of features providing contextual and driving behavioral information which are not homogeneously available; (B) A trip or trip segment $\tau$ is defined as a sorted collection of points $\{\rho_1, \ldots, \rho_n\}$; (C) Contextual Information $C_{\rho i}$ is defined as a set of features describing the context around the point $\rho_i$. Examples of such kind of features are: (i) road type, (ii) school zone, (iii) paved road; (D) Behavioral Information $B_{\rho i}$ is defined as a set of features describing the behavior of the driver around the point $\rho_i$. Examples of such kind of features are: (i) speed $v(\rho_i)$, (ii) positive acceleration $\alpha^+(\rho_i)$, (iii) negative acceleration $\alpha^-(\rho_i)$, (iv) vertical acceleration $\alpha^\dagger(\rho_i)$; (E) Population statistical information $S_{\rho i}$ is defined as a set of features describing the position in the empirical cumulative distribution of a user U in the point $\rho_i$ for the following features: (i) $v(\rho_i)$, (ii) $\alpha^+(\rho_i)$, (iii) $\alpha^-(\rho_i)$, (iv) $\alpha^\dagger(\rho_i)$; (F) Adhoc classifier module 471, ..., 475 or trip mode recognition module: This functional device takes in input a sequence of points $\rho_i$. Examples of such kind of features are: (i) speed $v(\rho_i)$, (ii) positive acceleration $\alpha^+(\rho_i)$, (iii) negative acceleration $\alpha^-(\rho_i)$, (iv) vertical acceleration $\alpha^\dagger(\rho_i)$.

For the sensing phase 4413, the mobile telematics devices 41, ..., 45, respectively, the mobile phone devices or mobile smart phone devices 441, ..., 445 require to be at least equipped with the following sensors: (i) Accelerometer sensor 4011, (ii) Gyroscope sensor 4012, and (iii) GPS sensor 4013. The frequencies for which the sensors may be logged are, for example, 1 Hz for the Global Positioning System (GPS) sensors 4013 and 50 Hz for accelerometers 4011 and gyroscopes 4012. Each measure of location data 40131 is captured in association with a time stamp 40132. Thus, for trips and/or trip-segments identification 1081, each measurement of the instantaneous movement telematics data 3 is captured and assigned to a measured time stamp by means of a polling device 461, ..., 465, wherein the measurements of the telematics data 3) are provided in an interval sensing within a defined time interval 4651 between two sensing steps. Before analyzing the data, the captured data need to be brought into a format that can be understood by the adhoc classifier module 471, ..., 475. The measurements stream can e.g. be chunked into windows of 1 s. Since acceleration data is expected to be sampled at 50 Hz, each window will consist of approximately 50 acceleration measurements with 3 dimensions and a time stamp 40132 each and approximately one GPS coordinate pair 40131 together with a timestamp 40132. (This is due to the fact that the actual sampling is implementation-dependent and only accessible on the hardware level). Each chunk is then treated individually as soon as it can be computed. After getting the needed format, as described above, the most likely principle components can e.g. be approximated. In determining them, the acceleration axes of the mobile device 441, ..., 445 can be turned into the axes of the actual movement, thus getting a more thoroughly rotated system of reference. The input of the operation consists of the acceleration vector only and will return rotated acceleration vectors of the same format.

The access to the sensors 401, ..., 405 can be made available in different ways depending on the operating system. For example, for Android-based mobile smart phone devices 441, ..., 445, Android allows the implementation of listeners over the sensors 401, ..., 405. As another example, for iOS-based mobile smart phone devices 441, ..., 445, iOS of Apple allows the logging of the sensors only when a significant change in the GPS position is observed. It is to be noted that per se the operation to monitor such condition doesn't drain battery amperage in the iOS because the device stores GPS position via physical motion co-processor. Android doesn't provide an API (Application Programming Interface) to interact with motion co-processor of the device (thus different chips might work in a different way). Under APIs, typically a set of commands provide that can be used to access specific functionality of the underlying operating system (OS) or hardware device. For example, in this case, a phone 441, ..., 445 might have a specific API that allows interacting with the motion co-processor of the device, or not. This drawback sometimes may be overcome. For example, a significant position change mechanism might be implemented via software in Android, but unfortunately the switch on operation of the GPS chip drains a lot the battery. It is further to be noted, that GPS's battery draining behavior is most noticeable during the initial acquisition of the satellite's navigation message: the satellite's state, ephemeris, and almanac. Acquiring each satellite takes 12 to 30 seconds. It is to be noted, that, for feature extraction, it may be preferably to add additional information with regards to the features to be extracted, where ever necessary. For example, the fast discrete Fourier Transform (FFT) is an efficient way to obtain the frequency modes of the time windows. In order to avoid variations in actual numerical scope, the following amendment may be necessary: Since most implementations opt for the most efficient algorithm that always treats time series in powers of two (i.e. sequences of length 2, 4, 8, 16 ... ), the time series have to be analyzed on the base of 64 measurement points: For a window size of 1 second and a sampling frequency of 50 Hz, we have 50 samples of acceleration values. This sequence is to be filled with zeros such that the input of the FFT consists of the necessary 64 numbers.

To minimize the battery consumption 4412, an ad hoc classifier 471, ..., 475 is realized with a polling device 461, ..., 465. The ad hoc classifier 471, ..., 475 is realized adhoc classifier module 471, ..., 475 and is realized based on a decision tree paradigm structure. The adhoc classifier module 471, ..., 475 takes as input $\alpha^x(\rho_i), \alpha^y(\rho_i), \alpha^z(\rho_i)$ and returns as output a status move, $\overline{move}$, as motion status signal. This is, by means of an adhoc classifier module 471, ..., 475, the motion status signal is dynamically generated automatically triggering significant movements of the mobile telematics device 41, ..., 45 and providing a measure for discriminating between dormant and sensing phase 4711/4712 with streaming signals by the sensors 401, ..., 405. The sensing phase is automatically interrupted, if the measured status signal switches to no significant movements of the mobile telematics device 41, ..., 45. For Android-based operating systems, a service running in background will be construed to trigger the adhoc classifier module 471, ..., 475 to detect whether the user is in a move status. For iOS-based operating systems the adhoc classifier module 471, ..., 475 is not required to achieve this functionality since the feature is provided by default by the operating system. In both systems, the logging phase 4414 captures the stream of signals from the sensors.

For the technical aspects of the sensing strategy, a continuous logging of sensors 4414 seems to be feasible from a mere technical implementation point of view, however, this might be completely unfeasible both from battery 4411 management point of view and stability aspects.

TABLE 1

| | Sensing battery consumption 4412 | | |
| --- | --- | --- | --- |
| | HTC Touch Pro State | | |
| Sensor | Active (1680 mW) | Idle (399 mW) | Sleep (7.56 mW) |
| Accelerometer (0.56 mW) | 0.03% | 0.14% | 7.4% |
| Temperature (0.21 mW) | 0.0125% | 0.053% | 2.78% |
| Barometer (1.68 mW) | 0.1% | 0.42% | 22.2% |
| Compass (2.24 mW) | 0.13% | 0.56% | 29.63% |
| Total | 0.2725% | 1.173% | 62.01% |

A deep analysis on the battery consumption 4412 during the sensing phase 4413 is needed. Table 1 shows the overhead introduced by popular types of sensors in the power consumption 4412 of a typical smartphone 441, ..., 445, the HTC Touch Prorunning Windows Mobile 6.1. The power overhead for every sensor is expressed as a percentage of the power consumed by the HTC phone in 3 representative power states: active, idle, and sleep. In the active state, the phone 441, ..., 445 is exercising its CPU by running random computations while simultaneously downloading data over the 3G radio. In the idle state the phone 441, ..., 445 is turned on, but there is no load imposed on the CPU beyond the background services introduced by the operating system. Also, no data is being sent or received over the 3G radio. In the sleep state the phone 441, ..., 445 is in sleep mode. Even though the continuous operation of the hardware sensors comes at a very small power overhead, the process of accessing and processing sensor data 3 on current state-of-the-art phones 441, ..., 445 might be extremely expensive. The reason is that for every sensor sample acquired by the phone 441, ..., 445, the main processor and associated components has to be active, creating a large energy overhead. Battery consumption 4412 analysis of transportation mode detection working in foreground are typically available from the manufacturer of the mobile phone device 441, ..., 445.

Figure 2:
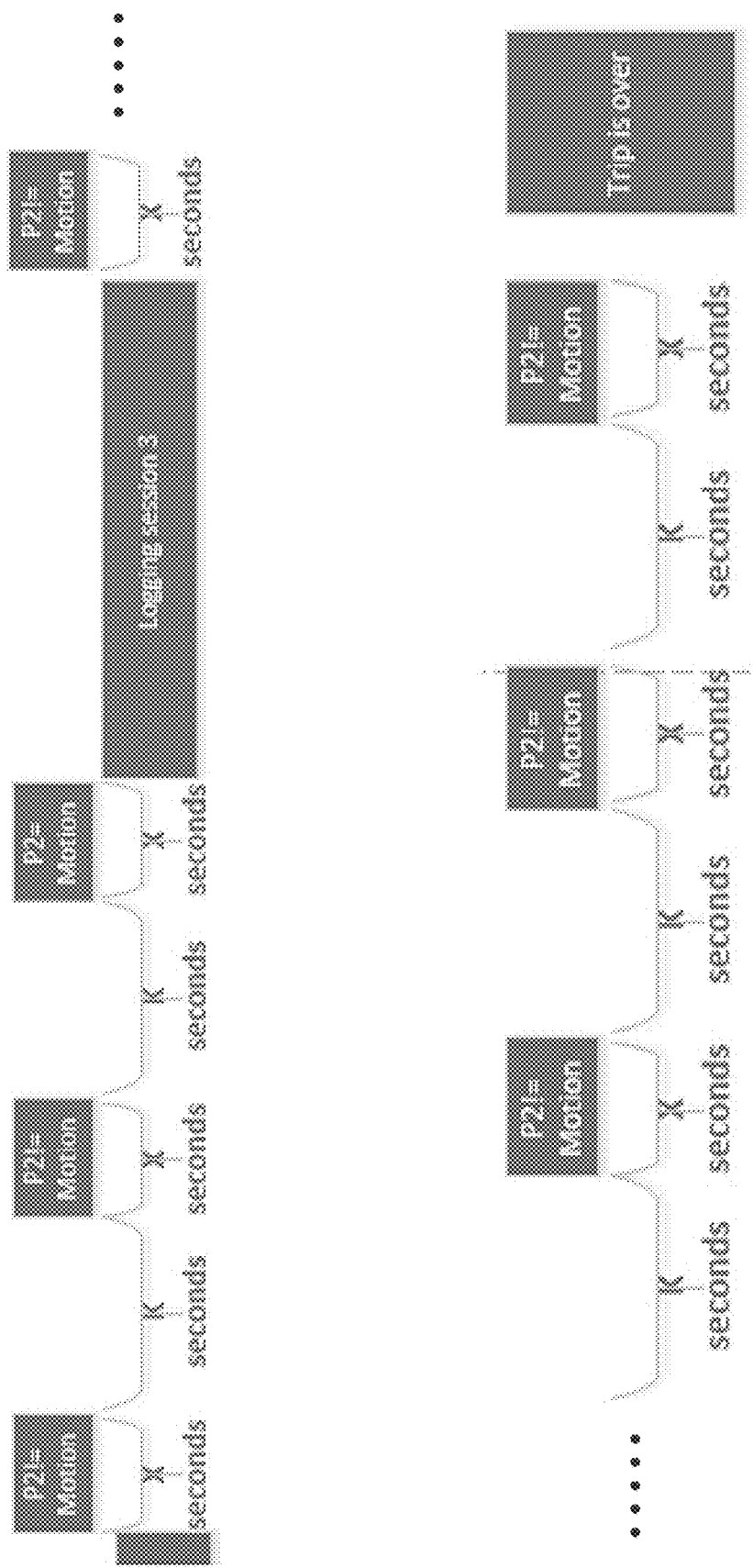
FIG. 2 shows another diagram schematically illustrating an exemplary polling mechanism with fixed time window of the inventive the sensing structure of the system 1, mitigating the battery consumption and reducing instability imposed by frequent switch from turn on-turn off of the sensors.
Figure 3:
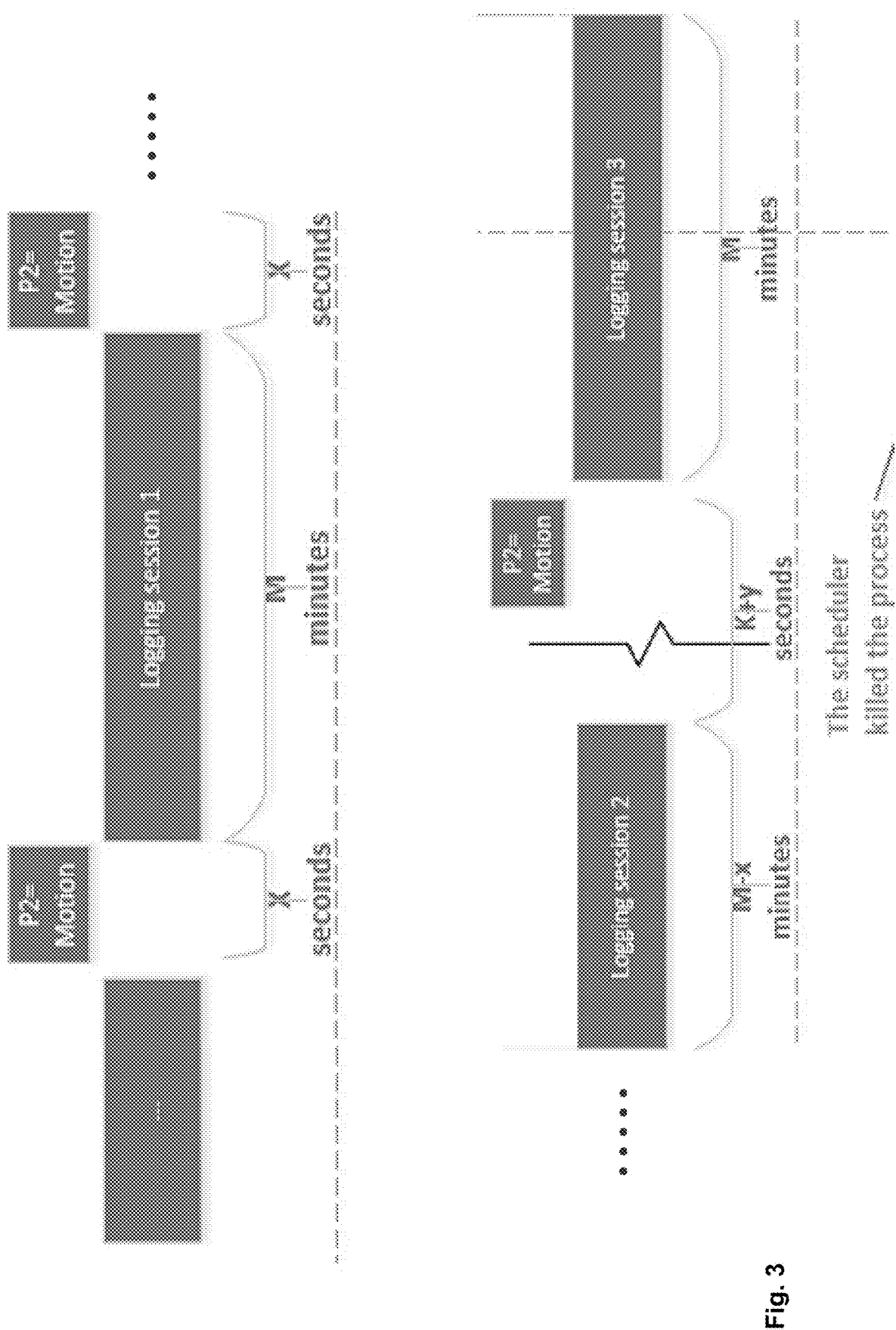
FIG. 3 shows another diagram schematically illustrating an exemplary polling mechanism with sensing motion signals of the inventive the sensing structure of the system 1. The introduction of the polling mechanism might introduce a loss information of K⁻ seconds. Basically, if a user of the mobile telematics devices 41, . . . , 45 shows activity, car-relevant will start immediately after the conclusion of the adhoc classifier module 471, . . . , 475 monitoring, the first K seconds will not be detected and processed.
Figure 4:
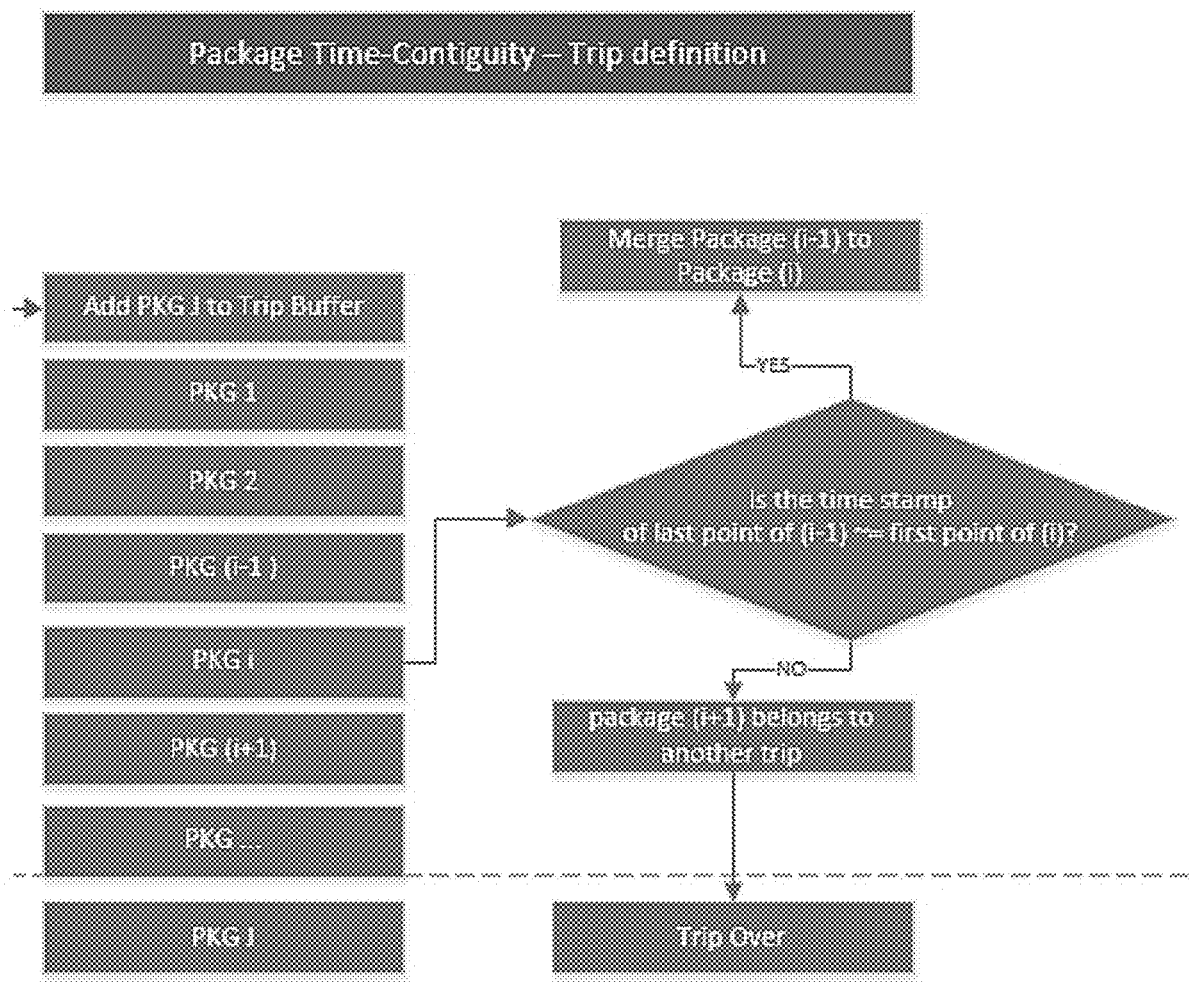
FIG. 4 shows another diagram schematically illustrating an exemplary structure of the trip and/or trip segment detection. The measured motion sensory data, i.e. the contiguous sets of motion status signals 4716 processed by means of the majority voting structure 4714 in order to validate its category requires to be buffered (trip buffer element 1002 in order to assess its membership to a trip 108.
Figure 5:
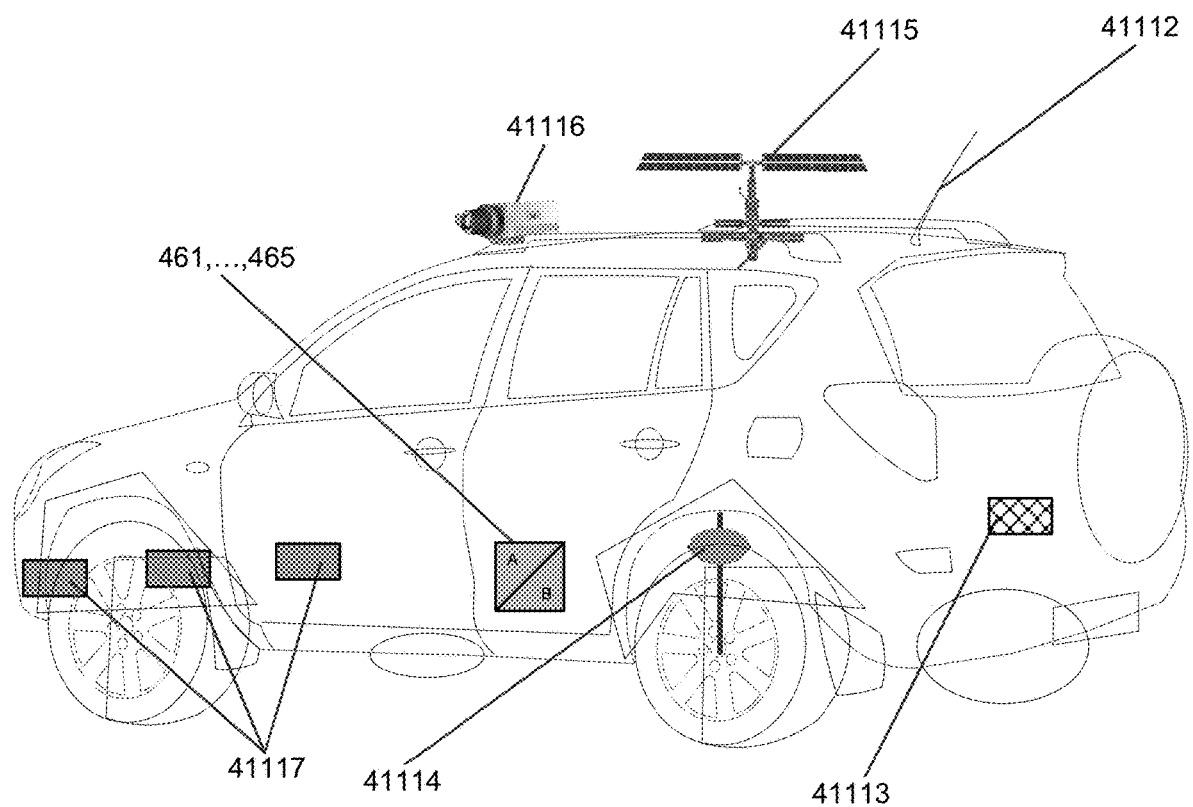
FIG. 5 shows schematically an exemplary motor vehicles 441, . . . , 445 equipped with appropriate telematics devices and exemplary on-board sensors and measuring devices 411, . . . , 415, i.e. the sensory data 41111/41121 capturing exteroceptive sensors or measuring devices 4111, the proprioceptive sensors or measuring devices 4112. Related to the exteroceptive sensors or measuring devices 4111, reference number 41112 denotes a global positioning system GPS (combined with measuring data from tachometers, altimeters and gyroscopes providing an accurate positioning), reference number 41113 ultrasonic sensors (measuring the position of objects very close to the motor vehicles 441, . . . , 445), reference number 41114 odometry sensors (complementing and improving GPS information), reference number 40115 a LIDAR (light detection and ranging) measuring device (monitoring the vehicle's surroundings as e.g. roads, vehicles, pedestrians, etc.), reference number 40116 video cameras (monitoring the vehicle's surroundings, as e.g. roads, vehicles, pedestrians, etc. and reading traffic lights), and reference number 41117 radar sensors (monitoring the vehicle's surroundings, as e.g., roads, vehicles, pedestrians, etc.).
Figure 6:
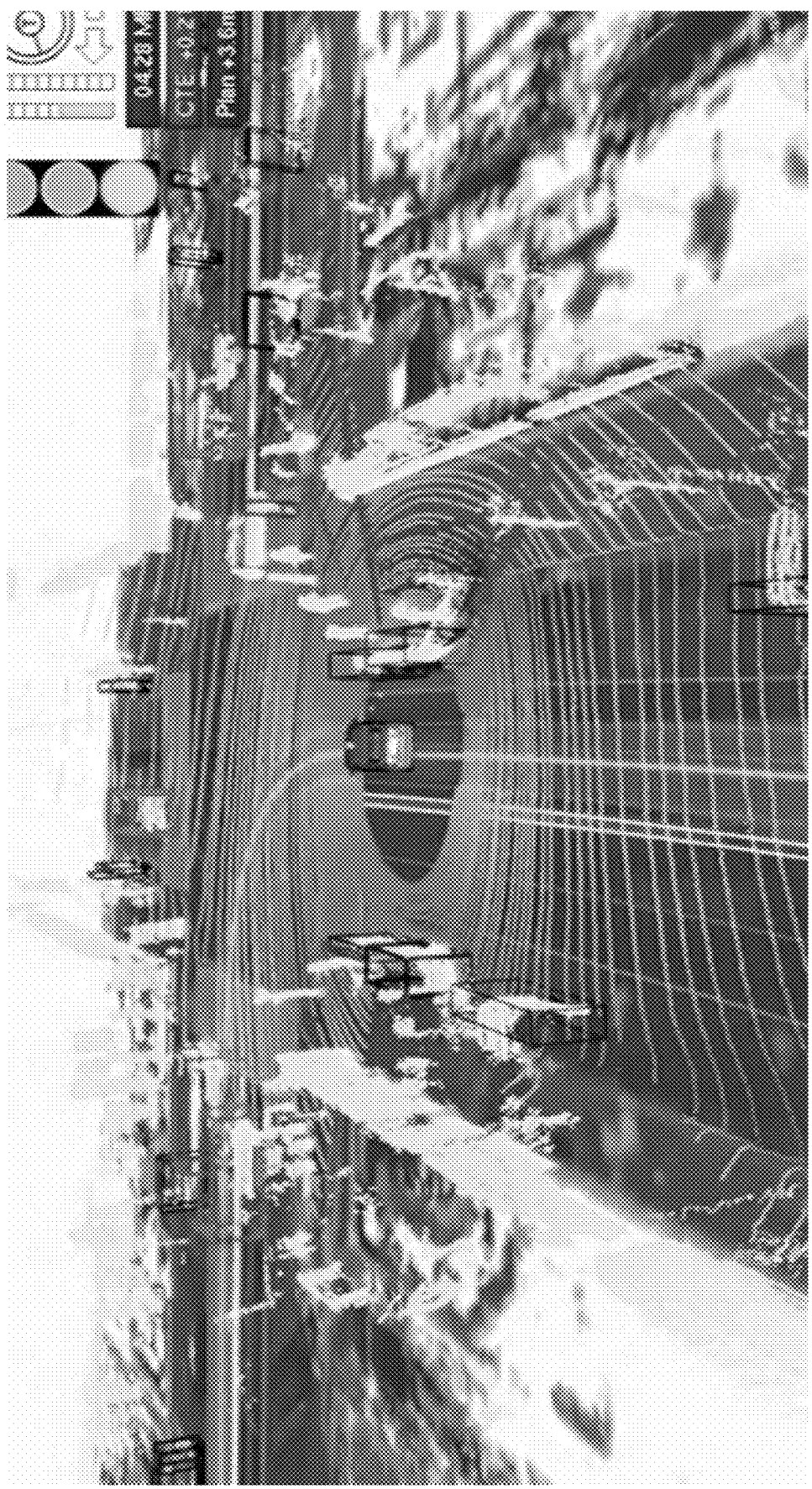
FIG. 6 shows a block diagram schematically illustrating exemplary the real-time automotive data capturing by means of the exteroceptive sensors 4111 for sensing environmental parameters 41111, and proprioceptive sensors 4112 for sensing operating parameters of the motor vehicles 441, . . . , 445.
Figure 7:
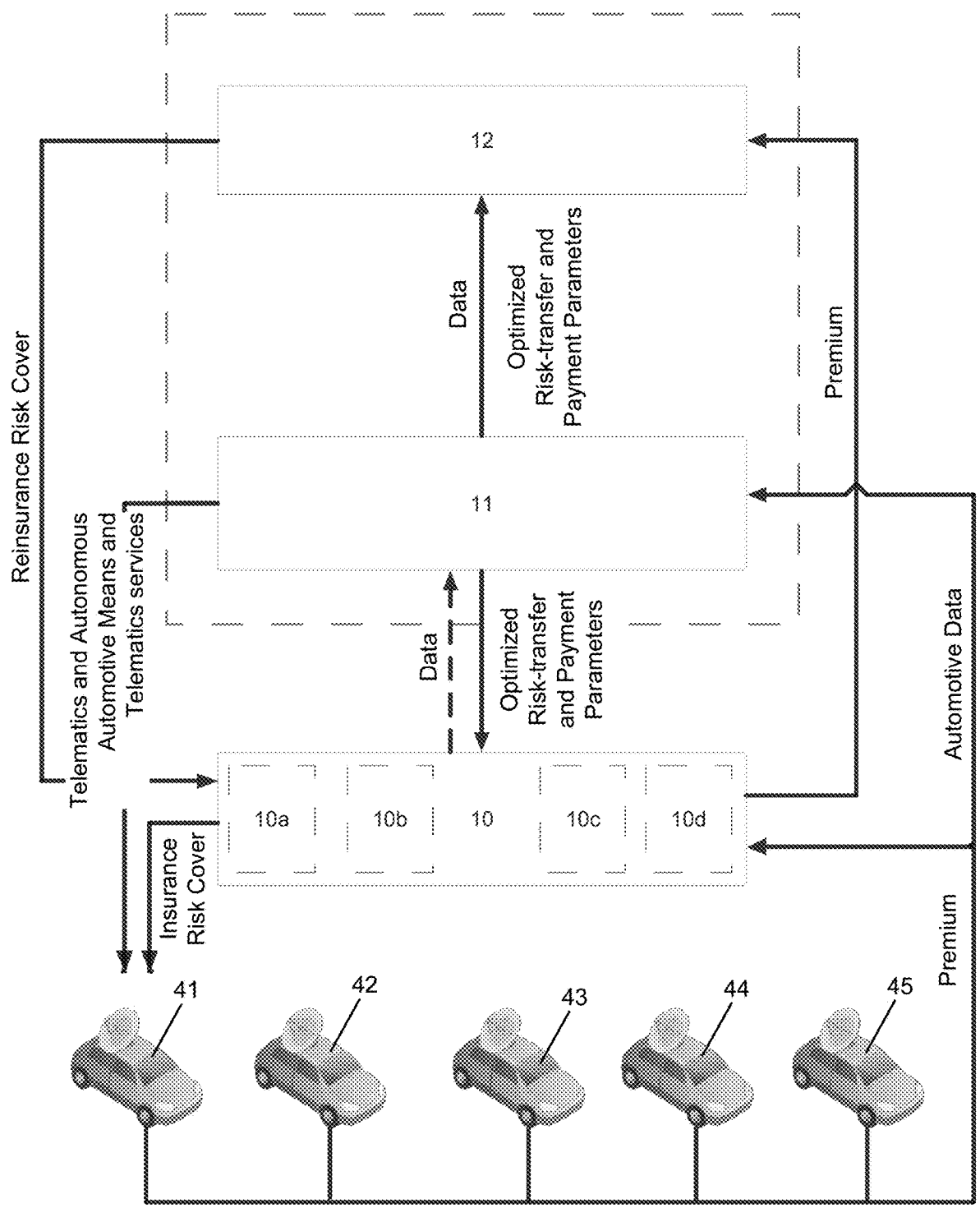
FIG. 7 shows a block diagram schematically illustrating an exemplary automotive-based, dynamic triggered, multi-tier risk-transfer system provided by the inventive system 1 with a plurality of associated motor vehicles 441, . . . , 445 capturing measuring parameters in real-time and dynamically adapting its operational parameters, according an embodiment variant of the invention. In particular, it shows the expert-system based electronic logging and track detection system 1. The telematics devices 41, . . . , 45 capture usage-based 31 and/or user-based 32 and/or operational 33 telematics data 3 of the motor vehicle 441, . . . , 445 and/or user 321, 322, 323, and transmit them via the data transmission network 2 to the dynamic trip-detection telematics circuit 10, which operates the coupled first and second risk-transfer systems by means of the dynamically optimized the first and second risk transfer parameters 501, . . . , 505/511, . . . , 515 and the correlated first and second payment transfer parameters 1121, . . . , 1125/1221, . . . , 1225. The system 1 is capable of capturing different kinds of telematics data 3, as also e.g. trips or trip segments 108 and driving patterns from the motor vehicles 441, . . . , 445 and/or automation level of the motor vehicle 441, . . . , 445 (driving itself partially or fully autonomous (auto piloting)) and/or if the user is intervening with its automated or safety features.
Figure 8:
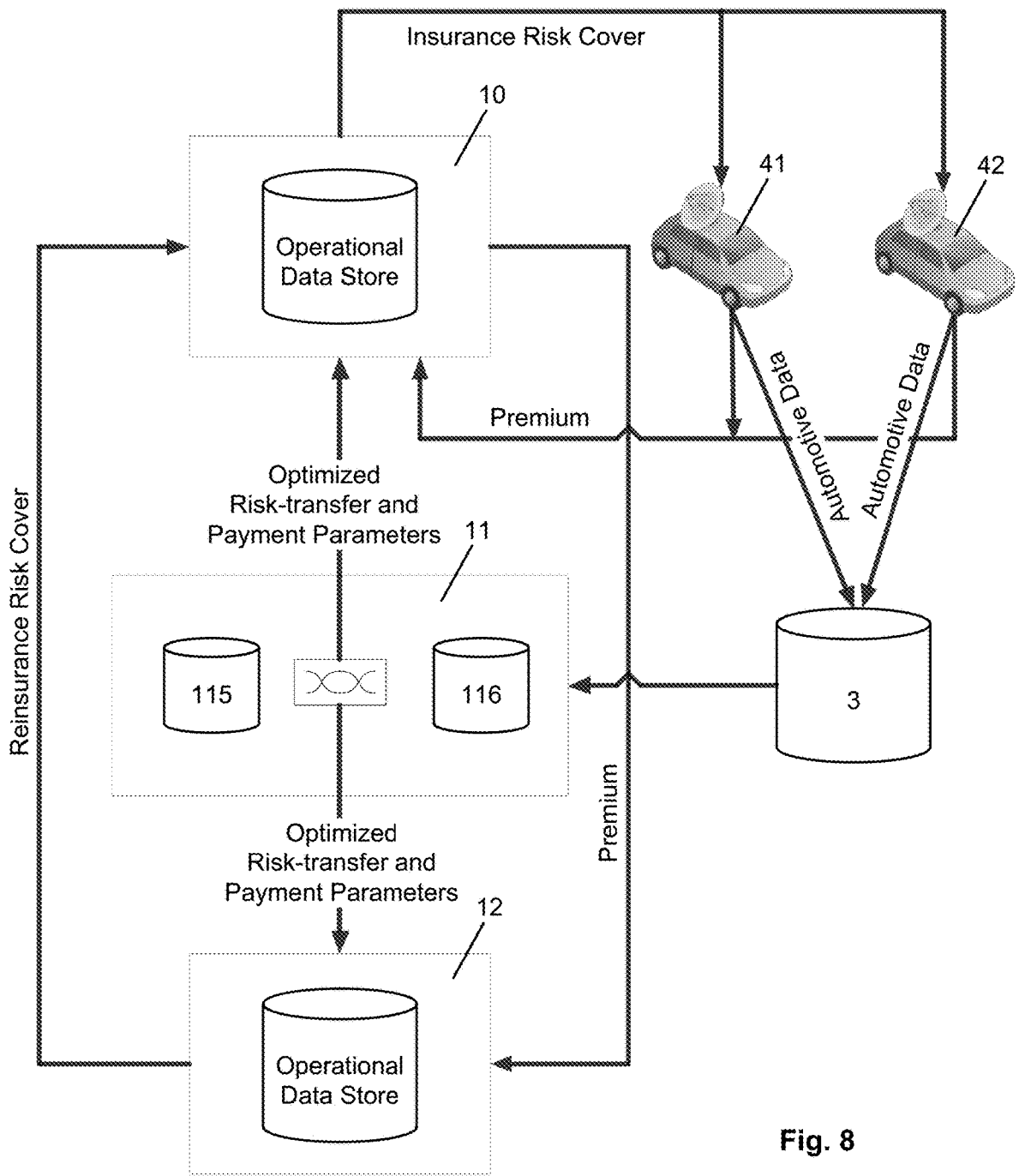
FIG. 8 shows another block diagram schematically illustrating an exemplary dynamically adaptable automotive car system 1 with a plurality of risk-exposed, associated motor vehicles 441, . . . , 445, according an embodiment variant of the invention. In particular, it shows an expert-system based or machine-learning based system 1. The control circuits 461, . . . , 465 capture usage-based 31 and/or user-based 32 and/or operating 33 telematics data 3 of the motor vehicle 441, . . . , 445 and/or user 321, 322, 323, and transmit them by means of the telematics devices 41, . . . , 45 via the data transmission network 2 to the dynamic trip-detection telematics circuit 10, which operates the coupled first and second risk-transfer systems 11/12 by means of the dynamically optimized the first and second risk transfer parameters 501, . . . , 505/511, . . . , 515 and the correlated first and second payment transfer parameters 1121, . . . , 1125/ 1221, . . . , 1225.
Figure 9:
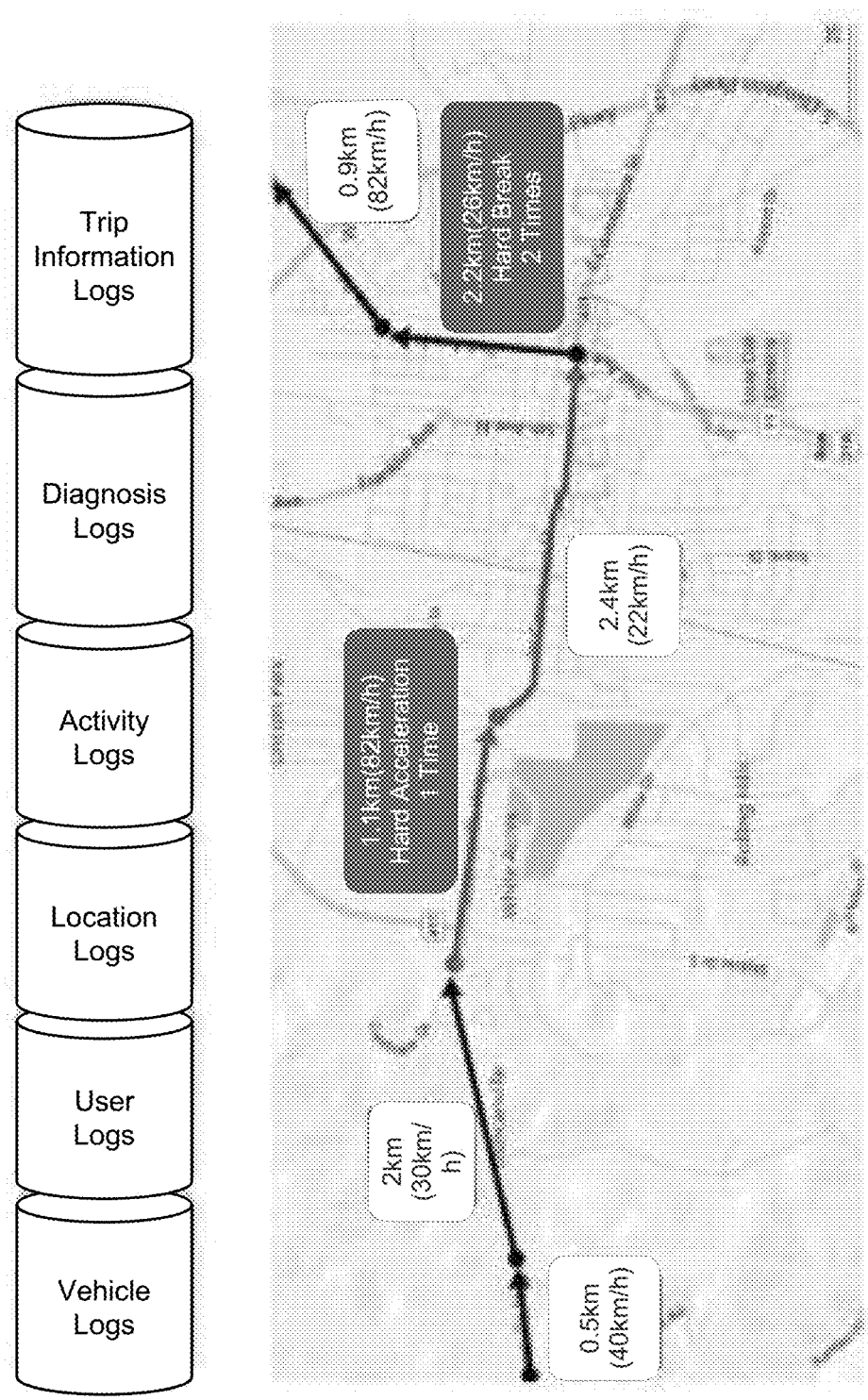
FIG. 9 shows a block diagram schematically illustrating exemplary the real-time automotive data capturing by means of the exteroceptive sensors 4111 for sensing environmental parameters 41111, and proprioceptive sensors 4112 for sensing operating parameters of the motor vehicles 441, ..., 445.

To mitigate the battery consumption 4412 and reduce instability imposed by frequent switch from turn on-turn off of the sensors 401, ..., 405, a polling mechanism is realized for optimizing the sensing strategy. Assumed, K be the number of seconds between two check operations of the adhoc classifier module 471, ..., 475 status depicted in FIG. 2. Assumed that X be the number of seconds required by the adhoc classifier module 471, ..., 475 to detect the status move, $\overline{move}$. The introduction of the polling mechanism might introduce a loss information of K$^-$ seconds. Basically, if a user activity move-relevant will start immediately after the conclusion of the adhoc classifier module 471, ..., 475 monitoring, the first K seconds will not be detected and processed. If the adhoc classifier module 471, ..., 475 status reports a state move, then the sensing phase is triggered like in FIG. 3. To optimize the data transmission from the mobile phone 441, ..., 443 to the dynamic trip-detection telematics circuit 10, the sensing phase collects data for at most M seconds (The sensing is interrupted once the adhoc classifier module 471, ..., 475 status is $\overline{move}$. At the end of the sensing phase the adhoc classifier module 471, ..., 475 assesses again the status to check whether the data sensing should trigger the collection of a new M seconds package. Thus, as an embodiment variant, at the end of the sensing phase of the time sequential telematics data 3 sensing, the polling device 461, ..., 465 can assess the status of the mobile device 41, ..., 45 determining when the data sensing should be triggered again, wherein the polling device 461, ..., 465 exploits the continuous cyclic background running of the adhoc classifier module 471, ..., 475, providing a variable waiting time, in order its sensing phase to become again active. In another embodiment variant, at the end of the sensing phase of the time sequential telematics data 3 sensing, the polling device 461, ..., 465 can e.g. assesse the status of the mobile device 41, ..., 45 determining when the data sensing should be triggered again, wherein the polling device 461, ..., 465 triggers an effective sleep of the adhoc classifier module 471, ..., 475 during the logging phase, generating a direct call to the adhoc classifier module 471, ..., 475 once the measured status signal switches to significant movements of the mobile telematics device 41, ..., 45.

The present invention comprises a dedicated back ground sensing as well as a dedicated data collection strategy. To log the sensors a background process requires to be active in order to trigger the adhoc classifier module 471, ..., 475 test. Assume that the process after K seconds activates the adhoc classifier module 471, ..., 475 check, the data acquisition will start. If the adhoc classifier module 471, ..., 475 status is move then the system has to check whether the motion status is move relevant. The adhoc classifier module 471, ..., 475 operation (trained in the Boolean mode move, $\overline{\text{move}}$) determines whether the transportation mode is move related. Scope of the operation of the adhoc classifier module 471, ..., 475 is to perform the data sensing over a stream of data and to buffer it in packages having size at most M seconds. The package is a sequence of chunks (each one is the minimum unit of input processable by the adhoc classifier module 471, ..., 475) classified by the adhoc classifier module 471, ..., 475. A trip mode label is then assigned to the package J according to the Boyer and Moore linear majority voting structure. For this, the adhoc classifier module 471, ..., 475 comprises a data buffer unit 4713 buffering a defined range of contiguous sets of motion status signals 4716 from the captured telematics data 3, removing spurious assignment by triggering only commonest motion status signals of a given set of the data buffer unit 4713 by their highest frequency based on a majority voting structure 4714 of the adhoc classifier module 471, ..., 475. The majority voting structure 4714 of the adhoc classifier module 471, ..., 475 is at least based on triggering the winning status of the previous set as basic majority voting structure, wherein if the winning status of the previous package belongs to the current set of winners, than the winning status is confirmed as winner for the current set, while otherwise a random selection from the current set of winners is performed by means of the adhoc classifier module 471, ..., 475. As a variant, the majority voting structure 4714 of the adhoc classifier module 471, ..., 475 can also at least based on triggering the winning status of the previous set as double majority voting structure, wherein if the winning status of the previous package belongs to the current set of winners, than the winning status is selected as winner for the current set, while otherwise a random selection from the current set of winners is performed by means of the adhoc classifier module 471, ..., 475, and wherein the selection is performed two-fold in cascade by means of the adhoc classifier module 471, ..., 475. As a further variant, the majority voting structure 4714 of the adhoc classifier module 471, ..., 475 can at least be based on triggering the winning status of the previous set as selective majority voting structure, wherein if the winning status of the previous package belongs to the current set of winners, than the winning status is selected as winner for the current set, while otherwise a random selection from the current set of winners is performed by means of the adhoc classifier module 471, ..., 475, and wherein the selection is performed by means of the adhoc classifier module 471, ..., 475 in an incremental way only if the current selection is different from the previous one. In another variant, the majority voting structure 4714 of the adhoc classifier module 471, ..., 475 is at least based on triggering the winning status of the previous set as half-selective majority voting structure, wherein if the winning status of the previous package belongs to the current set of winners, than the winning status is selected as winner for the current set, while otherwise a random selection from the current set of winners is performed by means of the adhoc classifier module 471, ..., 475, and wherein the selection is performed by means of the adhoc classifier module 471, ..., 475 in an incremental way only if the current selection is different from the previous one, and wherein the half-selective majority voting structure is only applied to half of a previous set of the data buffer unit 4713. Further, the majority voting structure 4714 of the adhoc classifier module 471, ..., 475 can also be at least based on triggering the winning status of the previous set as time-weight majority voting structure, wherein if the winning status of the previous package belongs to the current set of winners, than the winning status is confirmed as winner for the current set, while otherwise a random selection from the current set of winners is performed by means of the adhoc classifier module 471, ..., 475, and wherein each part of a set of the data buffer unit 4713 is assigned a weight privileging parts of the set lying in latest position of the package, thereby implementing a preference of more recent classifications with respect to older ones. Finally, the majority voting structure 4714 of the adhoc classifier module 471, ..., 475 can also be at least based on triggering the winning status of the previous set as confidence-weight majority voting structure, wherein if the winning status of the previous package belongs to the current set of winners, than the winning status is confirmed as winner for the current set, while otherwise a random selection from the current set of winners is performed by means of the adhoc classifier module 471, ..., 475, and wherein each part of a set of the data buffer unit 4713 is assigned a weight privileging parts of the set wherein the weight corresponds to the confidence of the class prediction, as provided in output by the decision tree classifier of the confidence-weight majority voting structure. However, the adhoc classifier module 471, ..., 475 can also be based on any combination of the discussed majority voting structure 4714. It is to be noted, that for the sensing phase 4413, the packaging and the majority voting strategy are performed completely on the mobile phone device 441, ..., 445 side or on the mobile telematics device 41, ..., 45 side. If the trip mode of the package J is move, then send the package to the back end, otherwise discard the package. The majority voting strategy is also implemented in the buffering phase within the adhoc classifier module 471, ..., 475. As an example, for the trip mode detection, the accuracy measured over 9261 trips was measured for the adhoc classifier module 471, ..., 475 accuracy under no majority voting. As could be shown in a confusion matrix, the accuracy is around 79.05%. The measures have been generated without the majority voting strategy, thru stratified cross validation. Interesting to notice that in this stage of the workflow it's important to minimize the false negative, (portion of trips that will be lost by the algorithm) that in this configuration are around 8.8%. In order to improve the trip mode recognition over the analysis of single segments 108, as mentioned, a structure called majority voting is added. The basic premise is to look over a large number of segments, e.g. 31, 45 or 61, and pick the most detected transport mode for the whole trip. Note that an uneven number of segments 108 is favorable in order to break ties. Although the basic majority voting structure is to attribute equal weight to each segment 108, a subtler variant may show to be superior in prediction quality, as e.g. the selective majority voting structure. Despite the differences in actual implementation, for an input of a time series, the adhoc classifier module 471, . . . , 475 may be realized as always to produce the same return: A single Boolean per time window that is true if the adhoc classifier module 471, . . . , 475 predicts that the input belongs to a car trip or false, if it does not exhibit this property. Additionally, the adhoc classifier module 471, . . . , 475 can be applied upon car trip 108 detection and will differentiate between proper transport modes such as (car, tram, train, bike, motorbike, bus, . . . ). This output can also be the basis for user feedback.

For the core of the trip 108 detection, a dedicated trip mode validation structure is realized. In this stage the package J, i.e. the sets of motion status signals 1001, is sent to the dynamic trip-detection telematics circuit 10. Each GPS point of the package J is enriched via the API. The enrichment service may provide among, for example, the other the following attributes: (i) (roadType): it describes the road category in which the point belongs to; and (ii) (distanceRoadType r): it describes the distance of the point from the closest road of type r. Both the attribute can be used to validate the trip mode label. The realization of the operation depends on the output of the API: if the output is provided as distance from the closest road, then it is required to introduce a threshold 47173: If a point is distant more than 0 meters, then consider it not in the road. (A reasonable theta, to be tested, may for example be 4 m). At the end, the majority structure described above is invoked to determine the package label $J_{label} \in \{move\_relevant, \overline{move\_relevant}\}$. Thus, the sets of motion status signals 1001, processed by the adhoc classifier module 471, . . . , 475, are transferred to the dynamic trip-detection telematics circuit 10. The points of the sets 1001 are automatically assigned to one of defined categories of roads 10014 and/or to a measured distance 10012 of the point 10011 to the closest road of a specific category 10014 by means of a trip-detection core engine 100. In case of a measured distance 10012, one of the defined categories of roads 10014 is only assigned, if a measured distance 10012 is triggered within a given threshold value 10013.

The sets of motion status signals 1001 with the road-type assigned points are time dependently piped in a trip buffer element 1002 of the trip-detection core engine 100 for assessing their membership to a trip or trip segment 108. To detect when a trip is finished, a trip contiguity is measurably determined over the sets of motion status signals 1001 buffered in the trip buffer element 1002 measuring the time difference of the time stamp of the last point belonging to buffered preceding set of motion status signals 1001 to the timestamp of the first point of the subsequent set of motion status signals 1001. If the time difference is lower a time threshold value 1003 the two sets of motion status signals 1001 are assigned to the same trip and/or trip segment 108, while otherwise the trip and/or trip segment 108 is triggered as finished. The time threshold value 1003 can e.g. be set equal or less 2 minutes. Therefore, for the trip 108 (end) detection, the packages processed thru the majority voting structure in order to validate its category requires to be buffered by means of the trip buffer element 1002 in order to assess its membership to a trip 108. In order to recognize when a trip 108 is over a process over the trip buffer element 1002 is run in order to check the contiguity in term of time of the last point of package J−1 with the first point of the package J. If the time difference is lower than, for example, 15 minutes, than the two packages belong to the same trip 108. For the system 1, different schemes of data probing can be differentiated with respect to how the trips 108 are constituted from the device perspective: (i) Automatic (continuous) data collection: Position and acceleration data is constantly tracked and sent to the IoT hub in packets, known as trip segments (for example 60 second segments); (ii) Manual data collection: Data collection (and hence, the trip 108 itself) is started and ended upon user interaction; (iii) Machine learning heuristic data collection as realized by the adhoc classifier module 471, . . . , 475: Trip start and end is determined by the adhoc classifier module 471, . . . , 475 machine learning heuristically provided. In this case, there is an assumption that the smartphone device 441, . . . , 451 will collect and send data as long as the adhoc classifier module 471, . . . , 475 is detecting move-type movement patterns. For the dynamic trip-detection telematics circuit 10 side this case is virtually identical to the previous in the sense that a formal trip end event should exist in the transmitted data, but could potentially (e.g. because of connection issues) be delayed or missing. In order to prevent 'microtrips' of length less than one minute, each trip segment 108 can, for example, always constitute a full trip 108 regardless of more start/stop events. This can be realized in order to account for the behavior of the mobile phone 441, . . . , 445 operation to always send full segments of data regardless of whether the trip starts or end within that period. E.g., it can therefore be semantically decided that the trip start event will always be at the beginning of the segment it occurs in and the trip end event will always be at the end of the segment. While the basic sentiment of the previous cases seems relatively simple, an actual implementation faces further challenges, notably the correct identification of membership and merging of potentially unsorted trip segments in the cases of discontinuous data collection. With that in mind, whenever a trip segment 108 is passed to the respective trip actor, there is a situation where there is a maximum of two compatible trips such that the new segment either (i) has timestamps that identify it as being before the one active trip 108, (ii) or has timestamps that identify it as being after the one active/inactive trip, (iii) or has timestamps that lie in between two respective (possibly inactive) trips 108 (i.e. for example within the 15 minute window of both of them), and (iv) or does not fit any active trip at all. While the first two cases enable the trip actor to merge the segment with the respective active trip 108, the third case requires additional logic: If the trip segment 108 is on a position that could be expected from the sending behavior of the device (i.e. the start and end timestamps match the segment length and spacing), it is added to the respective trip 108. Otherwise it is added to the currently active trip 108 (as that is buffered and can be changed easier should turn out that the segment does not fit) unless additional information (like a manual start event after the trip segment in question) demands to create another trip in between the two already existing trips in question. It is to be noted that the handling of trip segments 108 that contain overlapping time periods is to be differentiated. Typically, its handling needs to be added separately to the system 1 and its realization. Naturally, this situation would indicate that one or both of the overlapping segments are faulty. One possibility is to process those trip segments 108 based on heuristic-measures in order to determine which parts of the data to keep, if at all.

For the risk measurement and risk scoring measurement, the dynamic trip-detection telematics circuit 10 can e.g. comprises a vehicle-telematics driven core aggregator 104 with telematics data-based triggers 1001 triggering, capturing, and monitoring in the dataflow pathway 451, ..., 455 of the sensors 401, ..., 405 and/or the on-board diagnostic system 431, ..., 435 and/or the in-car interactive device 441, ..., 445 of the motor vehicle 441, ..., 445 said sensory data of the sensors of the mobile telematics device 4014 and/or operating parameters 41121 and/or environmental parameters 41111 during operation of the motor vehicle 41, ..., 45. The mobile telematics devices 400 can e.g. comprise at least a GPS module (Global Positioning System) and/or geological compass module based on a 3-axis teslameter and a 3-axis accelerometer, and/or gyrosensor or gyrometer, and/or a MEMS accelerometer sensor comprising a consisting of a cantilever beam with the seismic mass as a proof mass measuring the proper or g-force acceleration, and/or a MEMS magnetometer or a magnetoresistive permalloy sensor or another three-axis magnetometers. The dynamic trip-detection telematics circuit 10 can e.g. further comprise a driving score module 101 measuring and/or generating a single or a compound set of variable scoring parameters 1011, ..., 1013 profiling the use and/or style and/or environmental condition of driving during operation of the motor vehicle 41, ..., 45 based upon the triggered, captured, and monitored sensory data of the sensors of the mobile telematics device 4014 and/or operating parameters 41111 or environmental parameters 40121. Thus, system 1 scores individual drivers at least based on the measured, detected and recognized trips and/or trip segments 108, respectively, on the monitored sensory data of the sensors of the mobile telematics device 4014 and/or operating parameters 41111 or environmental parameters 41121. Based on the score and/or other relevant telematics data visible to consumers and the risk-transfer provider (insurers) (if consumer agrees), the first risk-transfer systems 11 are able to quote. The single or compound set of variable scoring parameters 1011, ..., 1013 are profiling the use and/or style and/or environmental condition of driving during operation of the motor vehicle 441, ..., 445 and can be e.g. generated by means of the driving score module 101 at least comprise scoring parameters measuring a driving score and/or a contextual score and/or a vehicle safety score. For the driving score, the contextual score and the vehicle safety score, (i) the variable driving scoring parameter is at least based upon a measure of driver behavior parameters comprising the identified maneuvers 91 and/or speed and/or acceleration and/or braking and/or cornering and/or jerking, and/or a measure of distraction parameters comprising mobile phone usage while driving and/or a measure of fatigue parameters and/or drug use parameters, (ii) the variable contextual scoring parameter is at least based upon measured trip score parameters based on road type and/or number of intersection and/or tunnels and/or elevation, and/or measured time of travel parameters, and/or measured weather parameters and/or measured location parameters, and/or measured distance driven parameters, and (iii) the variable vehicle safety scoring parameter is at least based upon measured ADAS feature activation parameters and/or measured vehicle crash test rating parameters and/or measured level of automation parameters of the motor vehicle 441, ..., 445 and/or measured software risk scores parameters. This automated scoring feature makes it possible to link all main contributors of accidents to risk relevant data points and risk drivers for scoring and risk measuring/assessment technical objects. By means of the CAN-BUS or TCU (Telematics control unit) data of the vehicle, the scoring and risk measurement/assessment can be achieved more accurately and in more precise manner for end consumers leading to an improved and optimized client centric experience and risk selection. Measuring at least the trips and/or trip segments 108, the scoring measurement can be improved by further contributors, which e.g. can comprise contributors as follows: (1) Distracted driving, (2) Speeding, (3) Drunk driving, (4) Reckless driving, (5) Rain, (6) Running red lights, (7) Running stop signs, (8) Teenage drivers, (9) Night driving, (10) Car design effects. A data link 21 is set by means of the wireless connection 4210 of the mobile telematics devices 41, ..., 45 over a mobile telecommunication network 2 between the mobile telematics devices 41, ..., 45 as client and the dynamic trip-detection telematics circuit 10. The mobile telematics devices 41, ..., 45 act as wireless node 221, ..., 225 within said mobile telecommunication network 2. The dynamic trip-detection telematics circuit 10 automatically generates said single or set compound of variable scoring parameters. Exemplary scores' measuring parameters could be as follows: e.g., driving score such as trips 108 and/or trip segments 108 and/or driving maneuvers and/or speed, acceleration, jerking, distraction, fatigue, traffic lights, distance (following too close), etc. and a contextual score such as weather, road types, road signs, etc. and vehicle safety score such as activated/usage of automated features, etc.

A shadow request 109 is transmitted to a plurality of automated first risk-transfer systems 11, decentrally connected to the dynamic time warping based telematics circuit 10 over a data transmission network. The shadow request 109 comprises at least risk-relevant parameters based upon the measured and/or generated single or compound set of variable scoring parameters 1011, ..., 1013. The dynamic time warping based telematics circuit 10 receives in response to the emitted shadow request 109 a plurality of individualized risk-transfer profiles 114 based upon the dynamically collected single or compound set of variable scoring parameters 1011, ..., 1013. The risk-relevant parameters of the shadow request 109 comprise at least usage-based 31 and/or user-based 32 and/or operating 33 telematics data 3 measured and/or generated by the mobile telematics devices 400 based upon the triggered, captured, and monitored sensory data of the sensors of the mobile telematics device 4014 and/or operating parameters 41111 or environmental parameters 41121, and the generated single or set compound of variable scoring parameters 1011, ..., 1013. The shadow requests 109 can e.g. be periodically transmitted to the plurality of automated first risk-transfer systems 11 based on the dynamically generated single or compound set of variable scoring parameters 1011, ..., 1013 and/or the triggered, captured, and monitored sensory data of the sensors of the mobile telematics device 4014 and/or operating parameters 41111 or environmental parameters 41121. A result list can be dynamically adapted in real-time and displayed to the user for selection via the dashboard or another interactive device of the telematics devices 41, ..., 45 and/or the motor vehicles 441, ... 445. However, the shadow requests 109 can also be generated and transmitted to the plurality of automated first risk-transfer systems 11 based on the dynamically generated single or compound set of variable scoring parameters 1011, ... , 1013 and/or the triggered, captured, and monitored sensory data of the sensors of the mobile telematics device 4014 and/or operating parameters 41111 or environmental parameters 41121, if the dynamic trip-detection telematics circuit 10 triggers an alternation of the dynamically generated single or compound set of variable scoring parameters 1011, ... , 1013 and/or the triggered, captured, and monitored sensory data of the sensors of the mobile telematics device 4014 and/or operating parameters 41111 or environmental parameters 41121. The result list 108 can be dynamically adapted in real-time and displayed to the user for selection. As embodiment variant, also a combination of the two before mentioned shadow request generations may be applied.

The dynamic trip-detection telematics circuit 10 can dynamically capture and categorize the received plurality of individualized risk-transfer profiles 114 of the automated first risk-transfer systems 11. The result list can be dynamically updated and provided for display and selection to the user of the mobile telematics devices 41, ... , 45 and/or motor vehicle 441, ... , 445 by means of the motor vehicles' dashboards based upon the triggered, captured, and monitored sensory data of the sensors of the mobile telematics device 4014 and/or operating parameters 41121 or environmental parameters 41111 during operation of the telematics devices 41, ... , 45 and/or motor vehicle 441, ... , 445. Therefore, the plurality of individualized risk-transfer profiles 114, provided by the automated first risk-transfer systems 11, time-dependently vary based on the generated single or compound set of variable scoring parameters 1011, ... , 1013 measuring the time-dependent use and/or style and/or environmental condition of driving during operation of the telematics devices 41, ... , 45 and/or motor vehicle 441, ... , 445. The electronic logging and track detection system 1 can e.g. automatically alert the user, if a more preferable risk-transfer profile 114 is triggered in relation to a before selected risk-transfer profile 114. Further, the telematics-based system 1 can also automatically adapt a risk-transfer associated with a user or motor vehicle 441, ... , 445, if a more preferable risk-transfer profile 114 is triggered in relation to a selected risk-transfer profile 114. The result list can dynamically be adapted in real-time and displayed to the user for selection based upon definable categorization criteria as for example first payment parameters 1121, ... , 1125 and/or duration and/or risk-transfer structure.

LIST OF REFERENCE SIGNS

1 Electronic logging and track detection system
10 Dynamic trip-detection telematics circuit
100 Trip-detection core engine
1001 Processed sets of motion status signals
10011 Points of a set of motion status signals
10012 Distance of point to closest road
10013 Threshold value for triggering distances
10014 Categories of road types
1002 Trip buffer element
1003 Time threshold value
101 Scores driving module
1011, ... , 1013 Scores driving parameters
1021, ... , 1023 Defined scores driving behavior pattern
102 Additional trigger triggering accident notification
103 Additional trigger triggering added services
104 Vehicle-telematics driven aggregator
1041 Predefined time period
105 Database with historical data
106 Automated database with location-depended data
107 Switching device
108 Trip or trip-segment
1081 Trip identication
109 Shadow request
11 First risk-transfer system
111 Automated resource pooling system
112 First data store
1121, ... , 1125 First payment parameters
113 First payment transfer modules
114 Individualized risk-transfer profiles
12 Second risk-transfer system
121 Automated resource pooling system
122 Second data store
1221, ... , 1225 Second payment parameters
123 Second payment transfer modules
1231 Control device
1232 Activation control parameter
124 Activation threshold parameter
125 Predefined loss covering portion
2 Data transmission network
20 Cellular network grid
201, ... , 203 Network cell/Basic service area
211, ... , 213 Base (transceiver) station
2111, ... , 2131 Cell Global Identity (CGI)
221, ... , 225 Mobile network nodes
21 Uni- or bidirectional data link
3 Telematics data/sensory data
31 Usage-based telematics data
311, ... , 313 Usage-based automotive data of the vehicles 41, ... , 45
32 User-based telematics data
321, ... , 323 User-based automotive data of the vehicles 41, ... , 45
33 Operational telematics data
331, ... , 333 Operational data of the control system 461, ... , 465
41, ... , 45 Mobile telematics device
401, ... , 405 Sensors of the mobile telematics device
4011 Accelerometer sensor
4012 Gyroscope sensor
4013 Global Positioning System (GPS) sensor
40131 Location data
40132 Time stamp
4014 Sensory data of the sensors of the mobile telematics device
411, ... , 415 Vehicle-based telematics sensors
4111 Exteroceptive sensors or measuring devices
41111 Sensory data of the exteroceptive sensors
41112 Global Positioning System (GPS)
41113 Ultrasonic sensors
41114 Odometry sensors
41115 LIDAR (light detection and ranging)
41116 Video cameras
41117 Radar Sensors
4121 Proprioceptive sensors or measuring devices
41211 Sensory data of the proprioceptive sensors
4131 Data transmission bus interface
4141 On-board diagnostic system
4151 In-car interactive device
421, ... , 425 Wireless or wired connections
431, ... , 435 Dataflow pathway of the mobile telematics device
441, ... , 445 Mobile phone device/Mobile smart phone device
4411 Battery 4412 Battery/power consumption
4413 Sensing phase
4414 Logging of sensors
451, . . . , 455 Motor vehicles
461, . . . , 465 Telematics data polling device
4651 Defined time interval between two sensing steps in a time-sequential sensing
4652 Start of sensing phase
4653 Stop of sensing phase
471, . . . , 475 Adhoc classifier module
4711 Dormant phase of the sensors 401, . . . , 405
4712 Sensing phase of the sensors 401, . . . , 405
4713 Data buffer unit
4714 Majority voting structure
4715 Triggered most common
4716 Contiguous sets of motion status signals
5 Aggregated risk exposure
51, . . . , 55 Transferred risk exposures of the motor vehicles
501, . . . , 505 First risk transfer parameters
511, . . . , 515 Second risk transfer parameters
6 Predefined risk events
61 Predefined risk events related to liability coverage for damages
611, . . . , 613 Parameters measuring the occurrence of events 61
62 Predefined risk events related to liability coverage for losses
621, . . . , 623 Parameters measuring the occurrence of events 62
63 Predefined risk events related to liability coverage for delay in delivery
631, . . . , 633 Parameters measuring the occurrence of events 63
71, . . . , 75 Occurred loss associated with the motor vehicles 41, . . . , 45
711, . . . , 715 Captured loss parameters of measured predefined event 1
721, . . . , 725 Captured loss parameters of measured predefined event 2
731, . . . , 735 Captured loss parameters of measured predefined event 3
80 Aggregated loss parameter
81 Aggregated payment parameter
82 Variable loss ratio parameter
821 Loss ratio threshold value

The invention claimed is:

1. An electronic logging and track detection system comprising:
a plurality of mobile telematics circuitry, wherein telematics data are measured by and logged from sensors of the mobile telematics circuitry and trips or trip-segments based on the telematics data are automatically identified and detected, wherein the telematics data comprise usage-based, user-based, or operation-based sensory data, and wherein the mobile telematics circuitry comprise one or more wireless connections, each of the mobile telematics circuitry acting as a wireless node within a corresponding data transmission network by antenna connections of the mobile telematics circuitry, wherein
the plurality of mobile telematics circuitry capturing the telematics data from the sensors are connected to a dynamic trip-detection telematics circuit, wherein a data link is set by the wireless connection between the dynamic trip-detection telematics circuit transmitting at least telematics data based on captured usage-based, user-based, or operational-based sensory data from the mobile telematics circuitry to the dynamic trip-detection telematics circuit, and wherein the sensors at least comprise an accelerometer sensor, a Global Positioning System (GPS) sensor, or a gyroscope sensor,
for trips or trip-segments identification, each measurement of instantaneous movement telematics data is captured and assigned to a measured timestamp by polling circuitry, wherein the measurements of the telematics data are provided in an interval sensing within a defined time interval between two sensing steps,
by adhoc classifier circuitry, a motion status signal is dynamically generated automatically triggering on significant movements of the mobile telematics circuitry and providing a measure for discriminating between dormant phase and sensing phase with streaming signals by the sensors, wherein the sensing phase is automatically interrupted, if the measured status signal switches to no significant movements of the mobile telematics circuitry,
at an end of the sensing phase of time sequential telematics data sensing, the polling circuitry assesses status of the mobile telematics circuitry determining when the telematics data sensing should be triggered again, wherein the polling circuitry exploits a continuous cyclic background running of the adhoc classifier circuitry, providing a variable waiting time, in order for the sensing phase to become again active,
the adhoc classifier circuitry comprises a data buffer buffering a defined range of contiguous sets of motion status signals from the captured telematics data, removing spurious assignment by triggering only commonest motion status signals of a given set of the data buffer by their highest frequency based on a majority voting structure of the adhoc classifier circuitry,
the sets of motion status signals, processed by the adhoc classifier circuitry, are transferred to the dynamic trip-detection telematics circuit, wherein points of the sets are automatically assigned to one of defined categories of roads or to a measured distance of the point to the closest road of a specific category by a trip-detection core engine, and wherein in a case of a measured distance, one of the defined categories of roads is only assigned, if a measured distance is triggered within a given threshold value, and
the sets of motion status signals with road-type assigned points are time dependently piped in a trip buffer element of the trip-detection core engine for assessing their membership to a trip or trip segment, wherein to detect when a trip is finished, a trip contiguity is measurably determined over the sets of motion status signals buffered in the trip buffer element measuring a time difference of the timestamp of the last point belonging to buffered preceding set of motion status signals to the timestamp of a first point of the subsequent set of motion status signals, and wherein if the time difference is lower a time threshold value the two sets of motion status signals are assigned to the same trip or trip segment, while otherwise a trip or a trip segment is triggered as finished.

2. The electronic logging and track detection system according to claim 1, wherein frequencies for which the sensors are logged are 1 Hz for the GPS sensor, 50 Hz for accelerometer sensor or gyroscope sensor.

3. The electronic logging and track detection system according to claim 1, wherein the polling circuitry triggers an effective sleep of the adhoc classifier circuitry during a logging phase, generating a direct call to the adhoc classifier circuitry once the measured status signal switches to significant movements of the mobile telematics circuitry.

4. The electronic logging and track detection system according to claim 1, wherein the majority voting structure of the adhoc classifier circuitry is at least based on triggering a winning status of the previous set as basic majority voting structure, wherein if the winning status of a previous package belongs to a current set of winners, than the winning status is confirmed as winner for the current set, while otherwise a random selection from the current set of winners is performed by the adhoc classifier circuitry.

5. The electronic logging and track detection system according to claim 4, wherein the adhoc classifier circuitry is based on any combination of the majority voting structure.

6. The electronic logging and track detection system according to claim 1, wherein the majority voting structure of the adhoc classifier circuitry is at least based on triggering a winning status of the previous set as double majority voting structure, wherein if the winning status of a previous package belongs to a current set of winners, than the winning status is selected as winner for the current set, while otherwise a random selection from the current set of winners is performed by the adhoc classifier circuitry, and wherein the selection is performed two-fold in cascade by the adhoc classifier circuitry.

7. The electronic logging and track detection system according to claim 1, wherein the majority voting structure of the adhoc classifier circuitry is at least based on triggering a winning status of the previous set as selective majority voting structure, wherein if the winning status of a previous package belongs to a current set of winners, than the winning status is selected as winner for the current set, while otherwise a random selection from the current set of winners is performed by the adhoc classifier circuitry, and wherein a selection is performed by the adhoc classifier circuitry in an incremental way only if a current selection is different from the previous one.

8. The electronic logging and track detection system according to claim 1, wherein the majority voting structure of the adhoc classifier circuitry is at least based on triggering a winning status of the previous set as half-selective majority voting structure, wherein if the winning status of a previous package belongs to a current set of winners, than the winning status is selected as winner for the current set, while otherwise a random selection from the current set of winners is performed by the adhoc classifier circuitry, and wherein a selection is performed by the adhoc classifier circuitry in an incremental way only if a current selection is different from the previous one, and wherein the half-selective majority voting structure is only applied to half of a previous set of the data buffer.

9. The electronic logging and track detection system according to claim 1, wherein the majority voting structure of the adhoc classifier circuitry is at least based on triggering a winning status of the previous set as time-weight majority voting structure, wherein if the winning status of a previous package belongs to a current set of winners, than the winning status is confirmed as winner for the current set, while otherwise a random selection from the current set of winners is performed by the adhoc classifier circuitry, and wherein each part of a set of the data buffer is assigned a weight privileging parts of the set lying in latest position of the previous package, thereby implementing a preference of more recent classifications with respect to older ones.

10. The electronic logging and track detection system according to claim 1, wherein the majority voting structure of the adhoc classifier circuitry is at least based on triggering a winning status of the previous set as confidence-weight majority voting structure, wherein if the winning status of a previous package belongs to a current set of winners, than the winning status is confirmed as winner for the current set, while otherwise a random selection from the current set of winners is performed by the adhoc classifier circuitry, and wherein each part of a set of the data buffer is assigned a weight privileging parts of the set wherein a weight corresponds to a confidence of a class prediction, as provided in output by a decision tree classifier of the confidence-weight majority voting structure.

11. The electronic logging and track detection system according to claim 1, wherein the given threshold value is set to 4 meters or smaller than 10 meters.

12. The electronic logging and track detection system according to claim 1, wherein the time threshold value is set equal or less 2 minutes.

13. The electronic logging and track detection system according to claim 1, wherein the mobile telematics circuitry are associated with a plurality of mobile cellular phones.

14. The electronic logging and track detection system according to claim 1, wherein the mobile telematics circuitry are associated with a plurality of motor vehicles.

15. The electronic logging and track detection system according to claim 14, wherein the mobile telematics circuitry associated with the plurality of motor vehicles comprise one or more wireless or wired connections, and a plurality of interfaces for connection with at least one of a vehicle's data transmission bus, a plurality of interfaces for connection with sensors, or measuring circuitry, wherein, for providing the wireless connections, the mobile telematics circuitry act as wireless nodes within a corresponding data transmission network by antenna connections of the mobile telematics circuitry and wherein the telematics circuitry are connected to an on-board diagnostic system or an in-car interactive circuit, and wherein the mobile telematics circuitry capture usage-based, user-based, operation-based telematics data of the motor vehicles or a user.

16. The electronic logging and track detection system according to claim 14, further comprising:
one or more first risk-transfer systems to provide a first risk-transfer based on first risk transfer parameters from at least some of the motor vehicles to one of the first risk-transfer systems, wherein the first risk transfer parameters are at least partially generated based upon an output signal generation steered or adapted by measured trip or trip-segment and risk measure parameters based on the telematics data, wherein the first risk-transfer systems comprise a plurality of payment transfer circuitry configured to receive and store first payment parameters associated with risk-transfer of risk exposures of the plurality of motor vehicles for pooling of their risks, and
a second risk-transfer system to provide a second risk-transfer based on second risk-transfer parameters from one or more of the first risk-transfer systems to the second risk-transfer system, wherein the second risk-transfer system comprises second payment transfer circuitry configured to receive and store second payment parameters for pooling of the risks of the first risk-transfer systems associated with risk exposures transferred to the first risk-transfer systems, wherein
by a vehicle-telematics driven aggregator of the dynamic trip-detection telematics circuit associated with the second risk-transfer system, risk-related usage-based or user-based telematics data captured from the mobile telematics circuitry are triggered and monitored by telematics data-based triggers in a dataflow pathway of the mobile telematics circuitry, the dynamic trip-detection telematics circuit associated with the second risk-transfer system further comprises driving score circuitry measuring or generating a single or the compound set of variable scoring parameters profiling the use, style, or environmental condition of driving during operation of the motor vehicles based upon the captured, triggered and monitored risk-related usage-based, user-based, or operational telematics data, by the dynamic trip-detection telematics circuit associated with the second risk-transfer system, a shadow request is transmitted to at least one of the first risk-transfer systems decentrally connected to the dynamic trip-detection telematics circuit over a data transmission network, wherein the shadow request comprises at least said single or the compound set of variable scoring parameters or risk-relevant parameters based upon the captured, triggered and monitored risk-related usage-based, user-based, or operational telematics data, and in response to the transmitted shadow request, individualized risk-transfer profiles based upon dynamically collected single or compound set of variable scoring parameters are transmitted from at least one of the first risk-transfer systems to a corresponding motor vehicle and issued by an interface of the mobile telematics circuitry for selection by a driver of the motor vehicles.

17. The electronic logging and track detection system according to claim 16, wherein scores driver circuitry of the dynamic trip-detection telematics circuit comprises a trigger for triggering and automatically selecting scores driver parameters based on defined scores driver behavior pattern by comparing captured telematics data with the defined scores driver behavior pattern.

18. The electronic logging and track detection system according to claim 17, wherein the scores driver circuitry automatically captures scores risks according to measured locations or trips of the motor vehicles based on the captured telematics data of the mobile telematics circuitry associated with the motor vehicles.

19. The electronic logging and track detection system according to claim 16, wherein by the dynamic trip-detection telematics circuit the shadow request is transmitted to a corresponding first risk-transfer system, if transmission of the shadow request is permitted by access control circuitry of the mobile telematics circuitry, wherein the single or a compound set of variable scoring parameters are generated by the driving score circuitry associated with the second risk-transfer system.

20. The electronic logging and track detection system according to claim 19, wherein the access control circuitry of the mobile telematics circuitry comprises a definable distribution table comprising a variable list with at least one first risk-transfer system, wherein the transmission of the shadow request to a specific first risk-transfer system depends on the definable distribution table of the access control circuitry of the mobile telematics circuitry.

21. The electronic logging and track detection system according to claim 20, wherein an individualized risk-transfer profiles of a first risk-transfer system is only issued by a display of the mobile telematics circuitry for selection by the driver of the motor vehicles, if issuance is permitted by access control circuitry of the electronic logging and track detection system.

22. The electronic logging and track detection system according to claim 21, wherein the single or compound set of variable scoring parameters profiling the use, style, or environmental condition of driving during operation of the motor vehicle and generated by the driving score circuitry at least comprise scoring parameters measuring a driving score and/or a contextual score and/or a vehicle safety score.

23. The electronic logging and track detection system according to claim 22, wherein a variable driving scoring parameter is at least based upon a measure of driver behavior parameters comprising the dynamically measured and detected trip or trip segment.

24. The electronic logging and track detection system according to claim 23, wherein captured contextual measuring parameters are at least based upon measured trip score parameters based on road type, number of intersection, tunnels, elevation, measured time of travel parameters, measured weather parameters, measured location parameters, or measured distance driven parameters.

25. The electronic logging and track detection system according to claim 1, wherein the GPS points of the sets of motion status signals are at least partially enriched by measured additional sensory data measured by further sensors of the mobile telematics circuitry or by sensory data measured by vehicle-based telematics sensors at any stage before transferring the sets of motion status signals to the dynamic trip-detection telematics circuit.

26. A method for an electronic logging and track detection system, the method comprising:

measuring and logging telematics data by sensors of a plurality of mobile telematics circuitry;

automatically identifying and detecting trips or trip-segments based on the telematics data, wherein the telematics data comprise usage-based, user-based, or operation-based sensory data, and wherein the mobile telematics circuitry comprise one or more wireless connections, each of the mobile telematics circuitry acting as a wireless node within a corresponding data transmission network by antenna connections of the mobile telematics circuitry;

capturing, by the plurality of mobile telematics circuitry, the telematics data from the sensors connected to a dynamic trip-detection telematics circuit, wherein a data link is set by the wireless connection between the dynamic trip-detection telematics circuit transmitting at least telematics data based on the captured usage-based, user-based, or operational-based sensory data from the mobile telematics circuitry to the dynamic trip-detection telematics circuit, and wherein the sensors at least comprise an accelerometer sensor, a Global Positioning System (GPS) sensor, or a gyroscope sensor, capturing and assigning, for trips or trip-segments identification, each measurement of the instantaneous movement telematics data to a measured timestamp by polling circuitry, wherein the measurements of the telematics data are provided in an interval sensing within a defined time interval between two sensing steps;

dynamically generating, by adhoc classifier circuitry, a motion status signal automatically triggering on significant movements of the mobile telematics circuitry and providing a measure for discriminating between dormant phase and sensing phase with streaming signals by the sensors, wherein the sensing phase is automatically interrupted, if the measured status signal switches to no significant movements of the mobile telematics circuitry;

at an end of the sensing phase of time sequential telematics data sensing, assessing, by the polling circuitry, status of the mobile telematics circuitry determining when the telematics data sensing should be triggered again, and exploiting, by the polling circuitry, a continuous cyclic background running of the adhoc classifier circuitry, providing a variable waiting time, in order for the sensing phase to become again active;

buffering, by a data buffer of the adhoc classifier circuitry, a defined range of contiguous sets of motion status signals from the captured telematics data, removing spurious assignment by triggering only commonest motion status signals of a given set of the data buffer by their highest frequency based on a majority voting structure of the adhoc classifier circuitry;

transferring the sets of motion status signals, processed by the adhoc classifier circuitry, to the dynamic trip-detection telematics circuit, wherein points of the sets are automatically assigned to one of defined categories of roads or to a measured distance of the point to the closest road of a specific category by a trip-detection core engine, and wherein in a case of a measured distance, one of the defined categories of roads is only assigned, if a measured distance is triggered within a given threshold value; and time dependently piping the sets of motion status signals with road-type assigned points in a trip buffer element of the trip-detection core engine for assessing their membership to a trip or trip segment, wherein to detect when a trip is finished, a trip contiguity is measurably determined over the sets of motion status signals buffered in the trip buffer element measuring a time difference of the timestamp of the last point belonging to buffered preceding set of motion status signals to the timestamp of a first point of the subsequent set of motion status signals, and wherein if the time difference is lower a time threshold value the two sets of motion status signals are assigned to the same trip or trip segment, while otherwise a trip or a trip segment is triggered as finished.

* * * * *